US012730341B2

(12) United States Patent
Li et al.

(10) Patent No.: US 12,730,341 B2
(45) Date of Patent: Sep. 8, 2026

(54) DIMMING WINDOW AND MANUFACTURING METHOD THEREOF

(71) Applicants: Beijing BOE Sensor Technology Co., Ltd., Beijing (CN); BOE TECHNOLOGY GROUP CO., LTD., Beijing (CN)

(72) Inventors: Zhan Li, Beijing (CN); Chunlei Wang, Beijing (CN); Xiaoqian Ju, Beijing (CN); Jianbo Zhao, Beijing (CN); Yuansheng Zang, Beijing (CN); Deshen Zhai, Beijing (CN); Peng Liang, Beijing (CN); Xiaolong Wu, Beijing (CN); Changyin Wang, Beijing (CN); Ying Wang, Beijing (CN); Juan Chen, Beijing (CN); Sikai Zhang, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 196 days.

(21) Appl. No.: 18/274,527

(22) PCT Filed: Mar. 31, 2022

(86) PCT No.: PCT/CN2022/084302

§ 371 (c)(1),
(2) Date: Jul. 27, 2023

(87) PCT Pub. No.: WO2023/184307

PCT Pub. Date: Oct. 5, 2023

(65) Prior Publication Data

US 2025/0004321 A1 Jan. 2, 2025

(51) Int. Cl.
*G02F 1/1335* (2006.01)
*G02F 1/1333* (2006.01)
*G02F 1/137* (2006.01)

(52) U.S. Cl.
CPC .. *G02F 1/133553* (2013.01); *G02F 1/133308* (2013.01); *G02F 1/137* (2013.01); *G02F 2202/04* (2013.01); *G02F 2202/28* (2013.01)

(58) Field of Classification Search
CPC ......... G02F 1/133553; G02F 1/133308; G02F 1/137; G02F 2202/04; G02F 2202/28;
(Continued)

(56) References Cited

U.S. PATENT DOCUMENTS

2018/0307111 A1* 10/2018 Le Houx ........... B32B 17/10174
2019/0299752 A1* 10/2019 Sadakane ............... B60K 35/60
(Continued)

FOREIGN PATENT DOCUMENTS

CN 105334658 A 2/2016
CN 113216821 A 8/2021
(Continued)

OTHER PUBLICATIONS

Office Action dated Jun. 25, 2026, issued in counterpart Chinese Patent Application No. 202280000637.3 with English translation (13 pages).

*Primary Examiner* — Jennifer D. Carruth
*Assistant Examiner* — Agnes Dobrowolski
(74) *Attorney, Agent, or Firm* — WHDA, LLP

(57) ABSTRACT

A dimming window and a manufacturing method thereof, belong to the technical field of dimming glass. The dimming window includes: at least two chambers arranged in a stack, each of the chambers comprising two light-transmitting substrates arranged opposite to each other; the at least two chambers include a first chamber and a second chamber, a
(Continued)

dinning structure is provided in the first chamber, and a first reflective film is provided in the first chamber and/or the second chamber; wherein the thickness of the second chamber is greater than or equal to the thickness of the first chamber, and the thickness of the chamber is a distance between two opposite surfaces of the two light-transmitting substrates of the chamber. The technical solution of the present disclosure can improve the shading effect of the dimming window.

15 Claims, 12 Drawing Sheets

(58) Field of Classification Search
CPC ...... G02F 1/13; G02F 1/13725; G02F 1/1333; G02F 1/1335; G02F 1/1339; E06B 9/24
See application file for complete search history.

(56) References Cited

U.S. PATENT DOCUMENTS

| | | | | |
|---|---|---|---|---|
| 2020/0363666 A1* | 11/2020 | Chi | ..................... | G02F 1/13475 |
| 2022/0390780 A1* | 12/2022 | Hu | ..................... | G02F 1/13452 |
| 2023/0194946 A1* | 6/2023 | Neyts | .................... | G02F 1/0063<br>359/296 |

FOREIGN PATENT DOCUMENTS

| | | | | | |
|---|---|---|---|---|---|
| CN | 113253507 | A | | 8/2021 | |
| CN | 113917740 | A | | 1/2022 | |
| CN | 114089560 | A | | 2/2022 | |
| CN | 215895169 | U | * | 2/2022 | |
| WO | WO-2016043164 | A1 | * | 3/2016 | ................ B60J 3/04 |

* cited by examiner 081
082
083
V
084
085

DIMMING WINDOW AND MANUFACTURING METHOD THEREOF

CROSS-REFERENCE TO RELATED APPLICATION

The present application is the U.S. national phase of PCT Application No. PCT/CN2022/084302 filed on Mar. 31, 2022, the entire content of which is incorporated herein by reference.

TECHNICAL FIELD

The present disclosure relates to the technical field of dimming glass, and particularly to a dimming window and a manufacturing method thereof.

BACKGROUND

Dimming glass is a kind of functional glass which can change the transmittance of light to achieve the transition between a transparent state and a shading state. It is widely used in building, transportation and other fields.

Improving the energy-saving effect of dimming glass is the key way to reduce the energy consumption of building cooling in summer and heating in winter, and is also the focus of construction market. The shading effect of the existing dimming glass is poor and cannot be adjusted between transparent state and shading state, so when the dimming glass is applied to buildings, it is unable to obtain obvious energy-saving effect.

SUMMARY

The technical problem to be solved by the present disclosure is to provide a dimming window and a manufacturing method thereof, which can improve the shading effect of the dimming window.

In order to solve the above technical problem, the embodiments of the present disclosure provide the following technical solutions.

In an aspect, a dimming window is provided, including

- at least two chambers arranged in a stack, each of the chambers comprising two light-transmitting substrates arranged opposite to each other;
- the at least two chambers include a first chamber and a second chamber, a dimming structure is provided in the first chamber, and a first reflective film is provided in the first chamber and/or the second chamber;
- wherein the thickness of the second chamber is greater than or equal to the thickness of the first chamber, and the thickness of the chamber is a distance between two opposite surfaces of the two light-transmitting substrates of the chamber.

In some embodiments, the dimming structure includes a dye liquid crystal dimming layer, the dye liquid crystal dimming layer includes a first substrate, a second substrate arranged opposite to each other and a dye liquid crystal layer provided between the first substrate and the second substrate, the dye liquid crystal layer includes liquid crystal molecules and dye molecules, and the liquid crystal molecules are used for driving rotation of the dye molecules under action of an electric field generated between the first substrate and the second substrate so as to control the transmittance of light.

In some embodiments, the dye liquid crystal layer includes a first dye liquid crystal layer and a second dye liquid crystal layer, the first dye liquid crystal layer and the second dye liquid crystal layer being bonded together by a bonding layer.

In some embodiments, the first chamber includes a first light-transmitting substrate and a second light-transmitting substrate arranged opposite to each other;

- the second chamber includes a third light-transmitting substrate and the second light-transmitting substrate arranged opposite to each other;
- the dimming structure is located on a side of the first light-transmitting substrate close to the second light-transmitting substrate.

In some embodiments, the first reflective film is located on a side of the second light-transmitting substrate close to the third light-transmitting substrate; and/or

- the first reflective film is located on a side of the second light-transmitting substrate close to the first light-transmitting substrate.

In some embodiments, the first reflective film is located on a side of the second light-transmitting substrate close to the third light-transmitting substrate; and/or

- the first reflective film is located on a side of the third light-transmitting substrate close to the second light-transmitting substrate.

In some embodiments, the thickness of the first chamber is a distance in a first direction between a surface of the first light-transmitting substrate close to the second light-transmitting substrate and a surface of the second light-transmitting substrate close to the first light-transmitting substrate;

- the thickness of the second chamber is a distance in the first direction between a surface of the third light-transmitting substrate close to the second light-transmitting substrate and a surface of the second light-transmitting substrate close to the third light-transmitting substrate;
- the first direction being a direction perpendicular to a surface of the first light-transmitting substrate.

In some embodiments, the thickness of the second chamber is 6-20 mm.

In some embodiments, a frame sealing structure is provided between two oppositely arranged light-transmitting substrates in each of the chambers, the frame sealing structure includes a sealing structure and a spacer, and a hollow structure having an air tightness is formed by bonding the sealing structure, the sealing structure including at least two layers of sealant.

In some embodiments, a distance between an edge of the dimming structure and a side of the frame sealing structure close to the dimming structure in the first chamber is 0.5-5 mm.

In some embodiments, the chambers are filled with argon.

In some embodiments, the sealing structure includes two layers of sealant, wherein

- the sealant at the side away from the dimming structure is a silicone adhesive, a polyurethane adhesive or a polysulfide adhesive;
- the sealant at the side close to the dimming structure is a hot-melt butyl adhesive or a polyisobutylene adhesive.

In some embodiments, the dimming structure is bonded to a surface of the light-transmitting substrate of the first chamber through a bonding layer.

In some embodiments, the first light-transmitting substrate adopts a sandwich structure of tempered glass, a PVB layer and tempered glass, and the blocking ratio of the PVB layer to light with a wavelength of less than or equal to 400 mm is greater than or equal to 99.9%; and/or

- the thickness of the PVB layer is not less than 0.8 mm.

An embodiment of the present disclosure further provides a method for manufacturing the dimming window, including:

forming at least two chambers arranged in a stack, each of the chambers comprising two light-transmitting substrates arranged opposite to each other;

the at least two chambers including a first chamber and a second chamber, forming a dimming structure in the first chamber, and forming a first reflective film in the first chamber and/or the second chamber;

wherein the thickness of the second chamber is greater than or equal to the thickness of the first chamber, and the thickness of the chamber is a distance between two opposite surfaces of the two light-transmitting substrates of the chamber.

The embodiments of present disclosure has the following beneficial effects.

In the above-mentioned solution, the dimming window includes a plurality of chambers, and the dimming structure is provided only in the first chamber, so that when the dimming window is applied to a building or traffic equipment, after receiving sunlight, even if the dimming structure absorbs part of the energy of visible light and the temperature thereof is increased, due to the blocking of other chambers, the dimming structure also avoids transferring heat into the building or traffic equipment, and the shading effect of the dimming window can be improved, thereby the energy consumption of the building or traffic equipment is reduced. In addition, the thickness of the second chamber is greater than or equal to the thickness of the first chamber, thereby the heat transfer coefficient of the dimming window is further reduced.

REFERENCE NUMERALS

Figure 1:
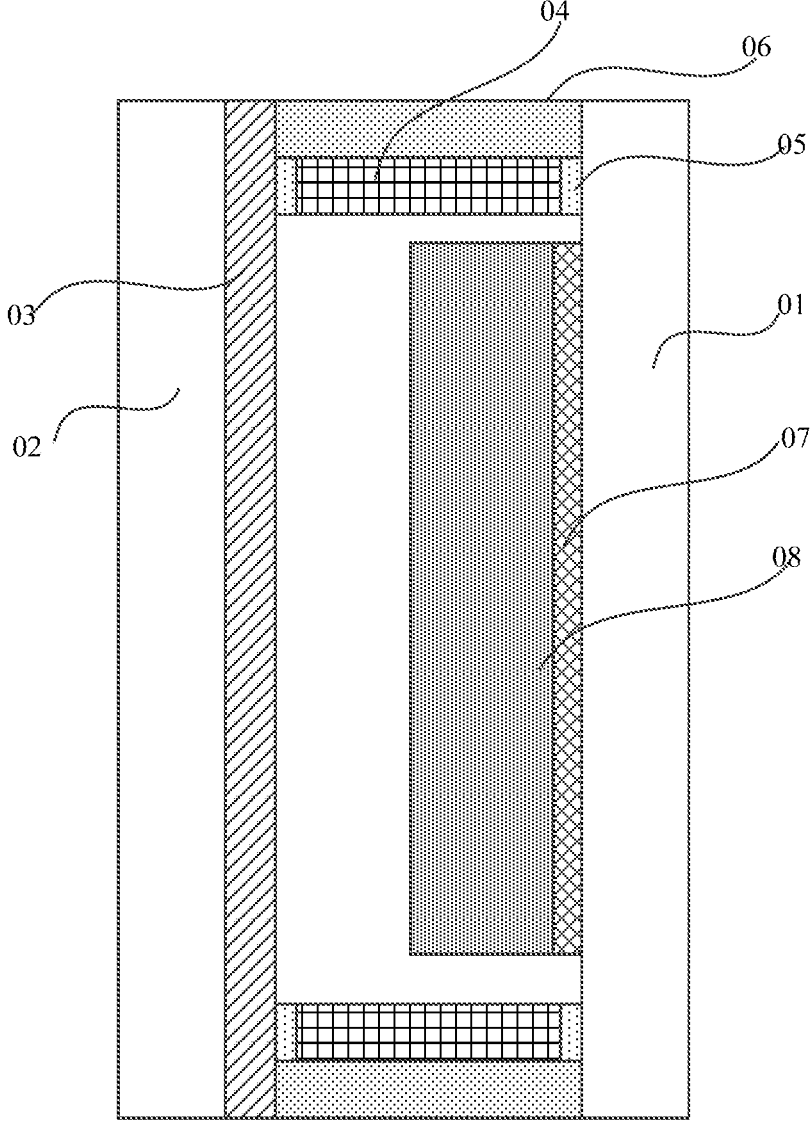
FIG. 1 is a schematic structural view of a prior art dye liquid crystal dimming window.

01 Indoor glass
02 Outdoor glass
03 Low radiation film
04 Spacer bar
05 First sealant
06 Second sealant
07 Bonding layer
08 Dye liquid crystal dimming layer
081 First base
082 First electrode layer
083 Dye liquid crystal layer
084 Second electrode layer
085 Second base
11 Third light-transmitting substrate
12 First light-transmitting substrate
13 First reflective film
14 Spacer
15 First sealant
16 Second sealant
17 Bonding layer
18 Dye liquid crystal dimming layer
19 Second light-transmitting substrate

DETAILED DESCRIPTION

In order that the technical problems, technical solutions, and advantages to be solved by the embodiments of the present disclosure will become more apparent, a detailed description will be given below with reference to the accompanying drawings and specific embodiments.

Hollow glass with good heat-insulating and sound-insulating functions is usually used as glass for curtain walls and lighting roofs, and improving the energy-saving effect of hollow glass is the key way to reduce the energy consumption of building cooling in summer and heating in winter, which is also the focus of the construction market. The energy-saving performance of architectural glass is mainly measured by thermal parameters, in which the shading coefficient (SC) represents the ratio of the indoor heat of solar radiation transmitted through the outer window to the amount of solar radiation projected onto the outer surface of the outer window, including both the energy directly radiated into the indoor by solar radiation and the energy introduced into the indoor by secondary heat transfer. The heat transfer coefficient (K) refers to the heat transferred through a unit area in an unit time when the temperature difference across the door and window is 1° C. under stable heat transfer conditions, and is in units of $W/(m^2 \cdot K)$, which represents the intensity of heat transfer process.

The structure of a common dye liquid crystal dimming window is as shown in FIG. 1, including indoor glass 01 and outdoor glass 02 oppositely arranged, wherein the outdoor glass 02 may be laminated glass and the indoor glass 01 may be tempered glass. A spacer is provided between the indoor glass 01 and the outdoor glass 02 to maintain the spacing between the indoor glass 01 and the outdoor glass 02, the indoor glass 01 and the outdoor glass 02 are sealed together via first sealant 05 and second sealant 06, and the dye liquid crystal dimming layer 08 is bonded to the indoor glass 01 through a bonding layer 07.

Figures 2, 3:
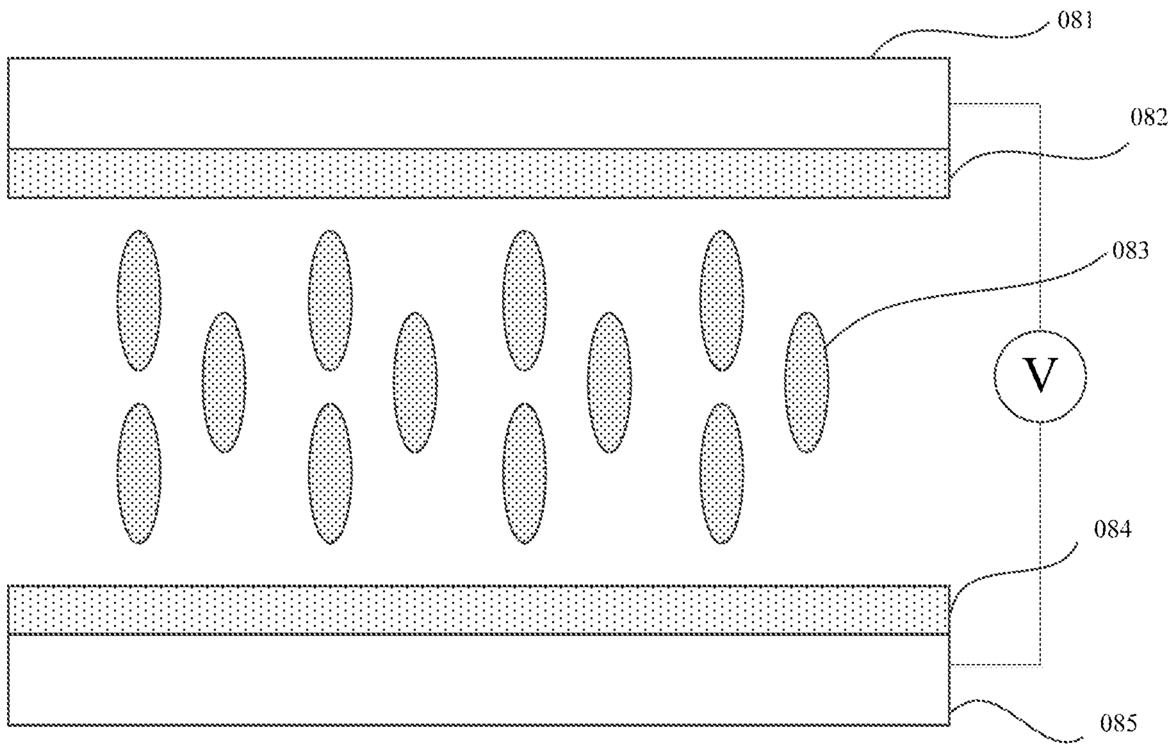
FIG. 2 is a schematic diagram of a dye liquid crystal dimming layer in a shading state.
FIG. 3 is a schematic diagram of a dye liquid crystal dimming layer in a transparent state.
Figure 4:
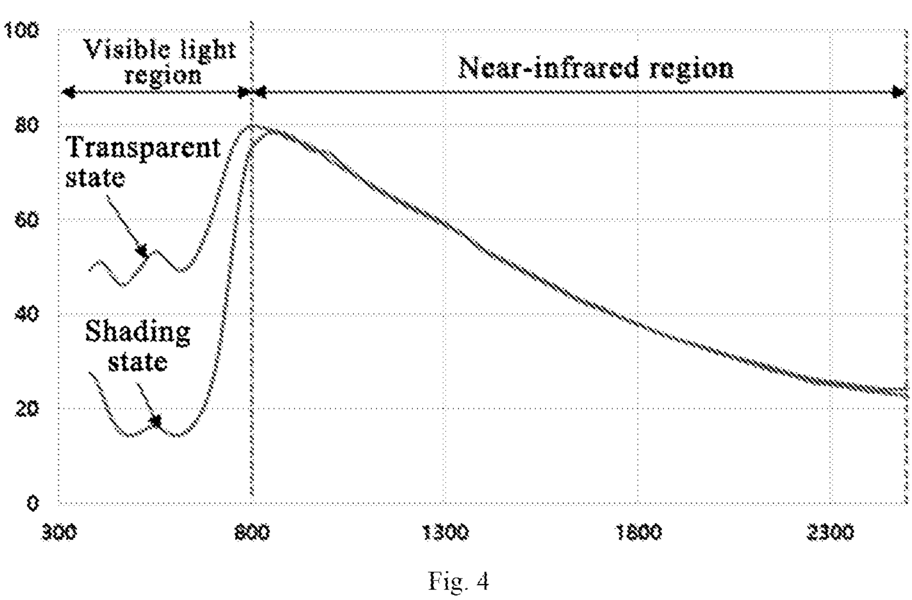
FIG. 4 is a schematic diagram of the transmission spectrum of a dye liquid crystal dimming layer.

The structure of the dye liquid crystal dimming layer is as shown in FIGS. 2 and 3, including a first base 081 and a second base 085 arranged opposite to each other, a first electrode layer 082 arranged on the first base 081, a second electrode layer 084 arranged on the second base 085, and a dye liquid crystal layer 083 located between the first electrode layer 082 and the second electrode layer 084, wherein the dye liquid crystal layer 083 is formed by mixing a negative liquid crystal and a dichroic dye, and the dichroic dye can rotate with the liquid crystal, and the absorption amount thereof gradually increases with the rotation angle. As shown in FIG. 2, when the driving voltage is 0 V, the liquid crystal and the dye molecules do not rotate, and the light absorption is the least, showing a shading state; as shown in FIG. 3, when the driving voltage is 10 V, the rotation angle of the liquid crystal and the dye molecules reaches a maximum of 90 degrees, and the absorption amount also reaches a maximum, exhibiting a transparent state.

The transmission spectrum of the dye liquid crystal dimming layer is shown in FIG. 3, and it can be seen that the dye liquid crystal dimming layer is only adjusted for the visible light region, and light in the near-infrared waveband can still enter the room through the window, causing the temperature in the room to increase, and therefore the dye liquid crystal dimming layer and the low radiation film 03 are used in combination to reduce the shading coefficient of the window. However, when the conventional dye liquid crystal dimming window is switched between the shading state and the transparent state, the shading coefficient is almost unchanged. In a specific example, the shading coefficient is 0.35 when the dye liquid crystal functional layer is in the shading state, and the shading coefficient is 0.33 when the dye liquid crystal functional layer is in the transparent state. The main reason for this is that the dye liquid crystal dimming layer absorbs part of the energy of visible light, resulting in its own temperature increase, and this part of the heat is transferred to the room through the convection of air on the room side. Thus, the existing dye liquid crystal dimming windows have a poor shading effect and cannot be adjusted between the transparent state and shading state. When the existing dye liquid crystal dimming windows are applied to buildings, significant energy-saving effects are often not obtained.

Embodiments of the present disclosure provide a dimming window and a manufacturing method thereof, which can improve the shading effect of the dimming window and facilitate the reduction of building energy consumption.

An embodiment of the present disclosure provides a dinning window, including:

at least two chambers arranged in a stack, each of the chambers comprising two light-transmitting substrates arranged opposite to each other;

the at least two chambers include a first chamber and a second chamber, a dimming structure is provided in the first chamber, and a first reflective film is provided in the first chamber and/or the second chamber;

wherein the thickness of the second chamber is greater than or equal to the thickness of the first chamber, and the thickness of the chamber is a distance between two opposite surfaces of the two light-transmitting substrates of the chamber.

In the present embodiment, the dimming window includes a plurality of chambers, and the dimming structure is provided only in the first chamber, so that when the dimming window is applied to a building or traffic equipment, after receiving sunlight, even if the dimming structure absorbs part of the energy of visible light and the temperature thereof is increased, due to the blocking of other chambers, the dimming structure also avoids transferring heat into the building or traffic equipment, and the shading effect of the dimming window can be improved, thereby the energy consumption of the building or traffic equipment is reduced. In addition, the thickness of the second chamber is greater than or equal to the thickness of the first chamber, thereby the heat transfer coefficient of the dimming window is further reduced.

When the dimming window is applied to a building, the first chamber is located outside a room of the building; when the dimming window is applied to a traffic device, the first chamber is located outside the traffic device.

The dimming window may include two chambers, three chambers or more chambers, and the more chambers are included, the better the shading effect of the dimming window is, and the lower the heat transfer coefficient is, but at the same time, an increase in cost and a decrease in transmittance of the dimming window are brought, and therefore, the dimming window preferably includes two or three chambers. When the dining window includes two or three chambers, on the one hand, the cost of the dimming window can be controlled to ensure the transmittance of the dimming window, and on the other hand, the shading effect of the dimming window can be better and the heat transfer coefficient can be lower.

In some embodiments, the dimming structure includes a dye liquid crystal dimming layer, the dye liquid crystal dimming layer includes a first substrate, a second substrate arranged opposite to each other and a dye liquid crystal layer provided between the first substrate and the second substrate, the dye liquid crystal layer includes liquid crystal molecules and dye molecules, and the liquid crystal molecules are used for driving rotation of the dye molecules under action of an electric field generated between the first substrate and the second substrate so as to control the transmittance of light.

In some embodiments, the dye liquid crystal layer may include a first dye liquid crystal layer and a second dye liquid crystal layer, the first dye liquid crystal layer and the second dye liquid crystal layer being bonded together by a bonding layer.

In this embodiment, as shown in FIGS. 2 and 3, the dye liquid crystal dimming layer includes a first base 081 and a second base 085 arranged opposite to each other, a first electrode layer 082 arranged on the first base 081, a second electrode layer 084 arranged on the second base 085, and a dye liquid crystal layer 083 located between the first electrode layer 082 and the second electrode layer 084, wherein the dye liquid crystal layer 083 is formed by mixing a negative liquid crystal and a dichroic dye, and the dichroic dye can rotate with the liquid crystal, and the absorption amount thereof gradually increases with the rotation angle. As shown in FIG. 2, when the driving voltage is 0 V, the liquid crystal and the dye molecules do not rotate, and the light absorption is the least, showing a shading state; as shown in FIG. 3, when the driving voltage is 10 V, the rotation angle of the liquid crystal and the dye molecules reaches a maximum of 90 degrees, and the absorption amount also reaches a maximum, exhibiting a transparent state. By controlling the voltages applied to the first electrode layer 082 and the second electrode layer 084, the liquid crystal rotation of the dye liquid crystal layer 083 is controlled, and thus the light transmitted through the dye liquid crystal dimming layer is controlled, so as to achieve the shading effect of the dimming window.

The transmission spectrum of the dye liquid crystal dimming layer is as shown in FIG. 3, and it can be seen that the dye liquid crystal dimming layer only adjusts for the visible light region, and light in the near-infrared waveband can still transmit through the dye liquid crystal dimming layer; therefore, in this embodiment, a first reflective film is provided in at least one of the at least two chambers, and the first reflective film can reflect near-infrared light, and, in cooperation with the dye liquid crystal dimming layer, can adjust and control light in the whole waveband. In this embodiment, the first reflective film may be provided in all of the at least two chambers, or may be provided in some of the at least two chambers. Although the first reflective film can reflect near-infrared light to improve the shading effect of the dimming window, the first reflective film also affects the transmittance of the dimming window at the same time, and therefore the dimming window may include one or two first reflective films, so that the shading effect and the transmittance of the dimming window can be taken into consideration, wherein the first reflective film may be located in the same chamber as the dye liquid crystal dimming layer, or may be located in different chambers.

Figure 5:
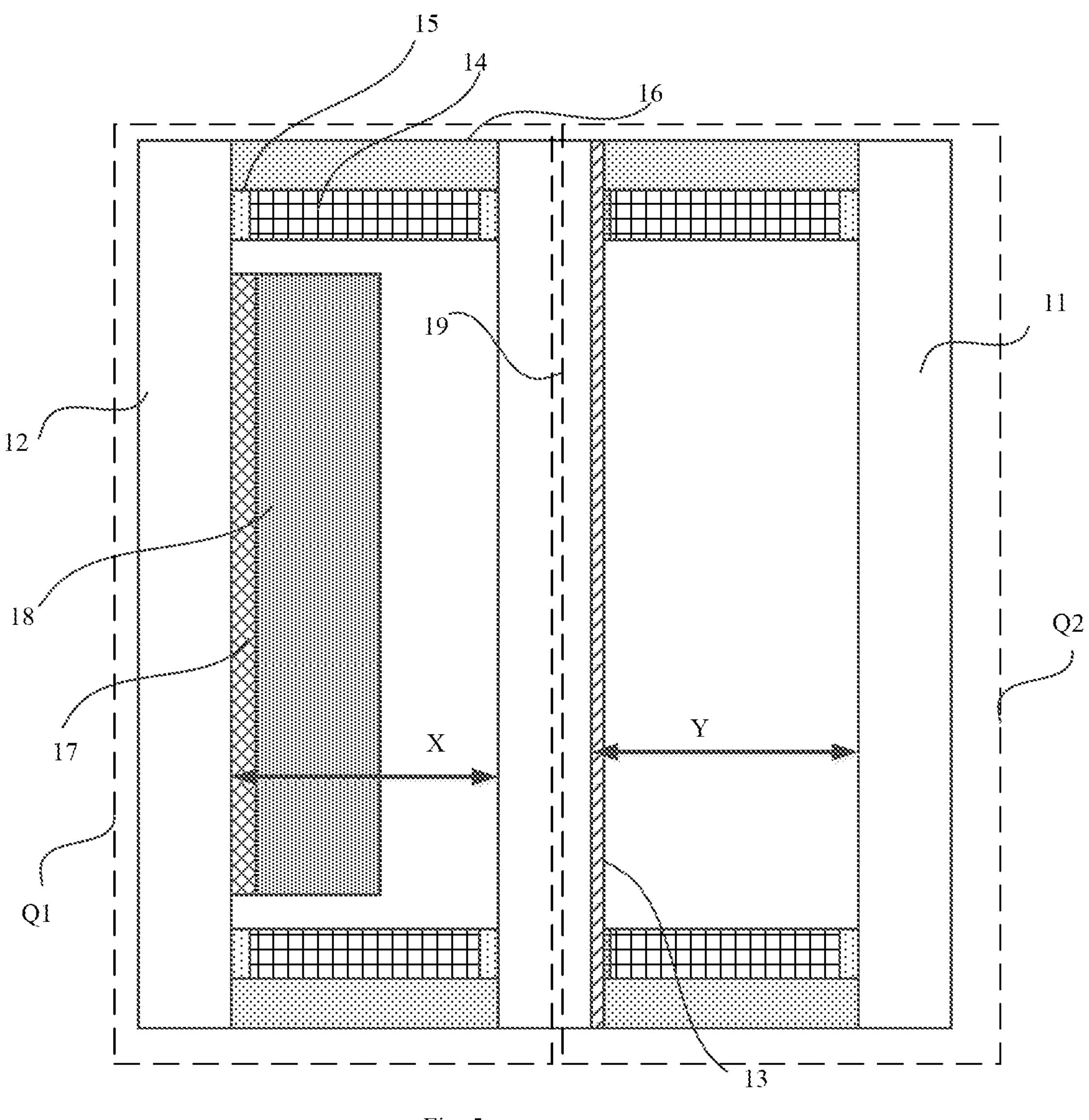
FIGS. 5-13 are schematic diagrams of a dimming window according to embodiments of the present disclosure.

In a particular embodiment, as shown in FIG. 5, the dimming window includes two chambers: a first chamber Q1 and a second chamber Q2, wherein the first chamber Q1 includes a first light-transmitting substrate 12 and a second light-transmitting substrate 19 arranged opposite to each other; the second chamber Q2 includes a third light-transmitting substrate 11 and a second light-transmitting substrate 19 arranged opposite to each other, and the first chamber Q1 and the second chamber Q2 share the second light-transmitting substrate 19 in order to reduce the thickness of the light-transmitting window. The first light-transmitting substrate 12, the third light-transmitting substrate 11 and the second light-transmitting substrate 19 may be glass or quartz, and in particular may be tempered glass, so as to improve the structural strength of the dimming window.

A spacer 14 is provided between the first light-transmitting substrate 12 and the second light-transmitting substrate 19 to maintain the spacing between the first light-transmitting substrate 12 and the second light-transmitting substrate 19, and the first light-transmitting substrate 12 and the second light-transmitting substrate 19 are bonded via a sealing structure to form a hollow structure with air tightness, and in order to ensure the tightness, the sealing structure includes at least two layers of sealant. As shown in FIG. 5, the sealing structure includes two layers of sealant; a first sealant 15 and a second sealant 16, wherein the first sealant 15 prevents the ingress of vapour; the second sealant 16 maintains the stability of the structure; the first sealant 15 may be a hot melt butyl adhesive, a polyisobutylene adhesive and a comfortable adhesive strip, etc.; and the second sealant 16 may be a silicone adhesive, a polyurethane adhesive and a polysulfide adhesive, etc. The chamber between the first light-transmitting substrate 12 and the second light-transmitting substrate 19 may be filled with argon gas, which has a low thermal conductivity, does not conduct heat easily, thereby better reducing the thermal conductivity of the dimming window; however, the present embodiment is not limited to filling the chamber between the first light-transmitting substrate 12 and the second light-transmitting substrate 19 with argon gas, and may also be filled with at least one of air, krypton and xenon.

The spacer 14 and the sealing structure constitute a frame sealing structure; in order to prevent the dye liquid crystal dimming layer 18 from contacting the surrounding frame sealing structure when the temperature changes, so that the dye liquid crystal dimming layer 18 is forced to break, the distance between the edge of the dye liquid crystal dimming layer 18 and the side of the frame sealing structure close to the dye liquid crystal dimming layer 18 is 0.5-5 mm. Too much distance will reduce the area of the dimming region and affect the overall aesthetics; if the distance is too small, the dye liquid crystal dimming layer 18 is easily damaged by squeezing when the temperature changes. Therefore, the distance between the edge of the dye liquid crystal dimming layer 18 and the side of the frame sealing structure close to the dye liquid crystal dimming layer 18 is designed to be 0.5-5 mm according to factors such as the manufacturing temperature of the hollow glass, the service temperature, the size of the hollow glass, the expansion/contraction performance of the material, etc.

A spacer 14 is provided between the third light-transmitting substrate 11 and the second light-transmitting substrate 19 to maintain the spacing between the third light-transmitting substrate 11 and the second light-transmitting substrate 19, and the third light-transmitting substrate 11 and the second light-transmitting substrate 19 are bonded via a sealing structure to form a hollow structure with air tightness; and in order to ensure the tightness, the sealing structure includes at least two layers of sealant. As shown in FIG. 5, the sealing structure includes two layers of sealant; a first sealant 15 and a second sealant 16, wherein the first sealant 15 prevents the ingress of vapour; the second sealant 16 maintains the stability of the structure; the first sealant 15 may be a hot melt butyl adhesive, a polyisobutylene adhesive and a comfortable adhesive strip, etc.; and the second sealant 16 may be a silicone adhesive, a polyurethane adhesive and a polysulfide adhesive, etc. The chamber between the third light-transmitting substrate 11 and the second light-transmitting substrate 19 may be filled with argon gas, which has a low thermal conductivity, does not conduct heat easily, thereby better reducing the thermal conductivity of the dimming window; however, the present embodiment is not limited to filling the chamber between the third light-transmitting substrate 11 and the second light-transmitting substrate 19 with argon gas, and may also be filled with at least one of air, krypton and xenon.

Figure 6:
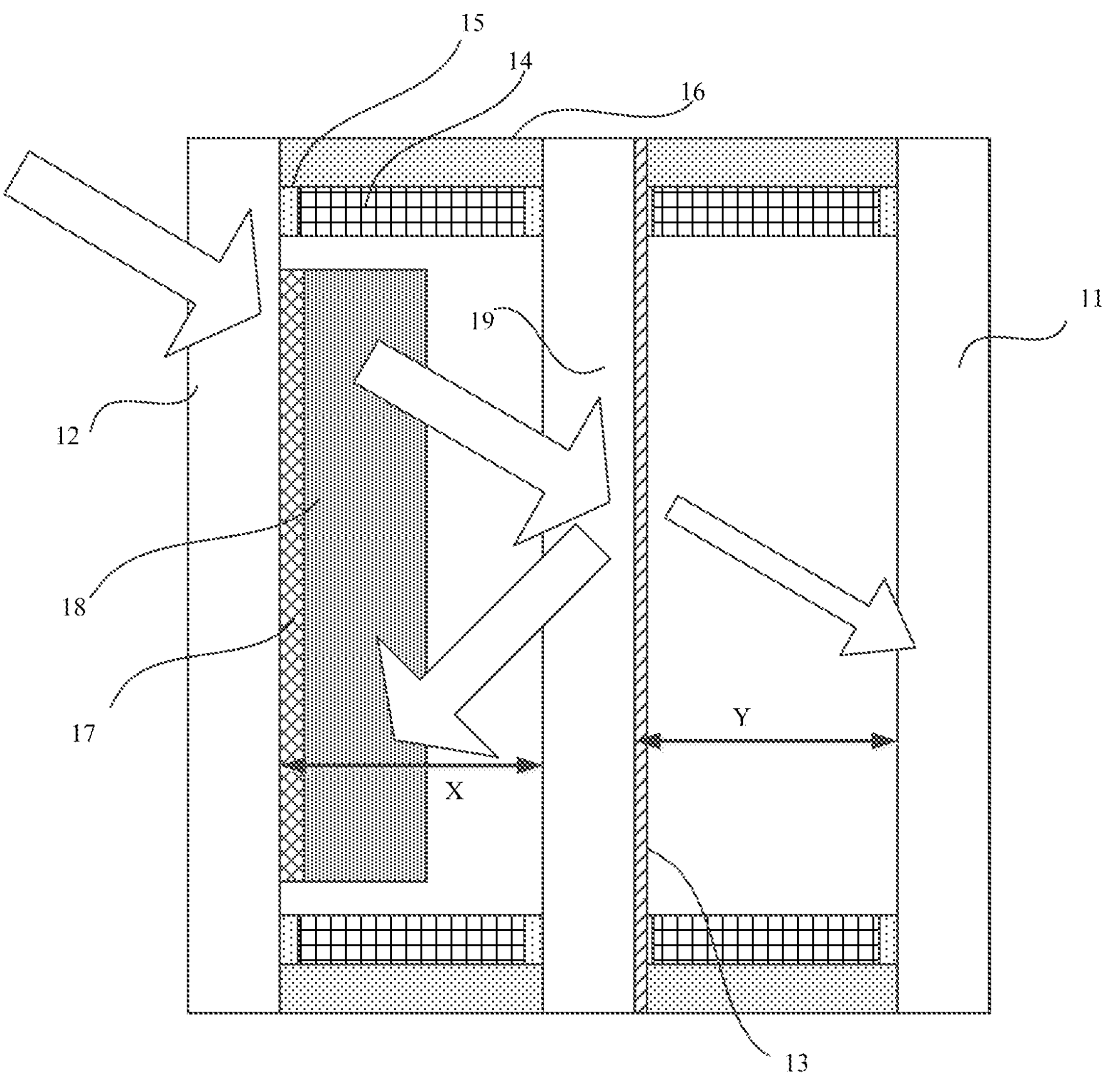

In this embodiment, in the first chamber Q1, the dye liquid crystal dinning layer 18 is bonded to the surface of the first light-transmitting substrate 12 via a bonding layer 17, which may be PVB adhesive. In the second chamber Q2, the first reflective film 13 is arranged on the surface of the second light-transmitting substrate 19, and as shown in FIG. 6, the first reflective film 13 can reflect light in the near-infrared waveband and incident light; the first reflective film 13 may be a Low-e film, and the emissivity of the Low-e film is low, which helps to reduce the heat transfer coefficient of the whole dimming window. In addition, the first reflective film 13 may be formed by coating a low-emissivity coating or an adhesive film on the surface of the second light-transmitting substrate 19 to reduce the emissivity of the dimming window.

In this embodiment, the first light-transmitting substrate 12 may have a sandwich glass structure, namely, a structure of tempered glass+PVB+tempered glass; since PVB has an ultraviolet blocking effect, the dye liquid crystal dimming layer 18 is relatively sensitive to the ultraviolet waveband, and the ultraviolet waveband should be blocked in order to ensure the stability of the dye liquid crystal material. In order to ensure the solar radiation stability of the dye liquid crystal dimming layer 18, the PVB in the sandwich glass structure should have a strong ultraviolet blocking ability, and it is generally required that the blocking ratio of the PVB to the light with the wavelength of less than or equal to 400 nm is greater than or equal to 99.9%. In order to improve the safety of the first light-transmitting substrate, the PVB in the sandwich glass structure can be thickened, for example, the thickness is increased from about 0.76 mm to more than 0.8 mm, for example, the thickness may be 1.52 mm, so as to improve the overall strength of the first light-transmitting substrate 12 and prevent the glass from breaking and falling after impact. In this embodiment, the dye liquid crystal dimming layer 18 is provided only in the first chamber Q1, so that when the dimming window is applied to a building or traffic equipment, even if the dye liquid crystal dimming layer 18 absorbs part of the energy of visible light and causes the temperature thereof to increase after receiving sunlight, the dye liquid crystal dimming layer 18 can prevent the dye liquid crystal dimming layer 18 from transferring heat to the building or traffic equipment due to the blocking of the second chamber Q2, and the shading effect of the dimming window can be improved, which is more conducive to reducing the energy consumption of the building or traffic equipment.

In this embodiment, the second chamber Q2 may be designed to have a different thickness than the first chamber Q1 such that the heat transfer coefficient of the gas in the first chamber Q1 near the outer side is greater than the heat transfer coefficient of the gas in the second chamber Q2 near the inner side to facilitate the heat transfer of the radiation at the first reflective film 13 to the outer side, reducing the thermal conductivity of the entire dimming window. In this embodiment, the thickness Y of the second chamber Q2 may be designed as the thickness corresponding to the lowest heat transfer coefficient, and the thickness X of the first chamber Q1 is less than Y, where the thickness of the first chamber is a distance in a first direction between a surface of the first light-transmitting substrate close to the second light-transmitting substrate and a surface of the second light-transmitting substrate close to the first light-transmitting substrate; the thickness of the second chamber is a distance in the first direction between a surface of the third light-transmitting substrate close to the second light-transmitting substrate and a surface of the second light-transmitting substrate close to the third light-transmitting substrate; the first direction being a direction perpendicular to a surface of the first light-transmitting substrate. The first chamber Q1 may have a thickness of 2-7 mm, for example, 6 mm; the thickness of the second chamber Q2 may be 6-20 mm, for example, 9 mm. The thickness of the chamber is related to the selection of the gas layer in the chamber, and when argon is contained in the second chamber Q2, the heat transfer coefficient is the lowest when the thickness of the second chamber Q2 is about 12 mm.

In this embodiment, when the thickness of the first chamber Q1 is 6 mm and the thickness of the second chamber Q2 is 6 mm, the visible light transmittance Tv of the dimming window is 8.9%-39.4%, the shading coefficient SC is 0.18-0.32, and the heat transfer coefficient is 1.41 $W/(m^2 \cdot K)$; when the thickness of the first chamber Q1 is 6 mm and the thickness of the second chamber Q2 is 9 mm, the visible light transmittance Tv of the dimming window is 8.9%-39.4%, the shading coefficient SC is 0.16-0.30, and the heat transfer coefficient is 1.16 $W/(m^2 \cdot K)$; when the thickness of the first chamber Q1 is 6 mm and the thickness of the second chamber Q2 is 12 mm, the visible light transmittance Tv of the dimming window is 8.9%-39.4%, the shading coefficient SC is 0.15-0.29, and the heat transfer coefficient is 1.04 $W/(m^2 \cdot K)$; when the thickness of the first chamber Q1 is 6 mm and the thickness of the second chamber Q2 is 15 mm, the visible light transmittance Tv of the dimming window is 8.9%-39.4%, the shading coefficient SC is 0.14-0.28, and the heat transfer coefficient is 1.05 $W/(m^2 \cdot K)$; when the thickness of the first chamber Q1 is 6 mm and the thickness of the second chamber Q2 is 18 mm, the visible light transmittance Tv of the dimming window is 8.9%-39.4%, the shading coefficient SC is 0.12-0.25, and the heat transfer coefficient is 1.07 $W/(m^2 \cdot K)$; when the thickness of the first chamber Q1 is 6 mm and the thickness of the second chamber Q2 is 20 mm, the visible light transmittance Tv of the dimming window is 8.9%-39.4%, the shading coefficient SC is 0.14-0.25, and the heat transfer coefficient is 1.09 $W/(m^2 \cdot K)$;

when the thickness of the first chamber Q1 is 4 mm and the thickness of the second chamber Q2 is 6 mm, the visible light transmittance Tv of the dimming window is 8.9%-39.4%, the shading coefficient SC is 0.18-0.31, and the heat transfer coefficient is 1.47 $W/(m^2 \cdot K)$; when the thickness of the first chamber Q1 is 4 mm and the thickness of the second chamber Q2 is 9 mm, the visible light transmittance Tv of the dimming window is 8.9%-39.4%, the shading coefficient SC is 0.16-0.30, and the heat transfer coefficient is 1.20 $W/(m^2 \cdot K)$; when the thickness of the first chamber Q1 is 4 mm and the thickness of the second chamber Q2 is 12 mm, the visible light transmittance Tv of the dimming window is 8.9%-39.4%, the shading coefficient SC is 0.15-0.29, and the heat transfer coefficient is 1.08 $W/(m^2 \cdot K)$; when the thickness of the first chamber Q1 is 4 mum and the thickness of the second chamber Q2 is 15 mm, the visible light transmittance Tv of the dimming window is 8.9%-39.4%, the shading coefficient SC is 0.14-0.28, and the heat transfer coefficient is 1.10 $W/(m^2 \cdot K)$; when the thickness of the first chamber Q1 is 4 mm and the thickness of the second chamber Q2 is 18 mm, the visible light transmittance Tv of the dimming window is 8.9%-39.4%, the shading coefficient SC is 0.14-0.28, and the heat transfer coefficient is 1.13 $W/(m^2 \cdot K)$; when the thickness of the first chamber Q1 is 4 mm and the thickness of the second chamber Q2 is 20 mm, the visible light transmittance Tv of the dinning window is 8.9%-39.4%, the shading coefficient SC is 0.14-0.28, and the heat transfer coefficient is 1.13 $W/(m^2 \cdot K)$;

The difference between the shading coefficient in the transparent state and the shading coefficient in the shading state (namely, the shading coefficient when the dye liquid crystal dimming layer 18 is in the shading state) of the dimming window in the present embodiment can reach 0.14, and the shading coefficient can be adjusted between the shading state and the transparent state.

Figure 7:
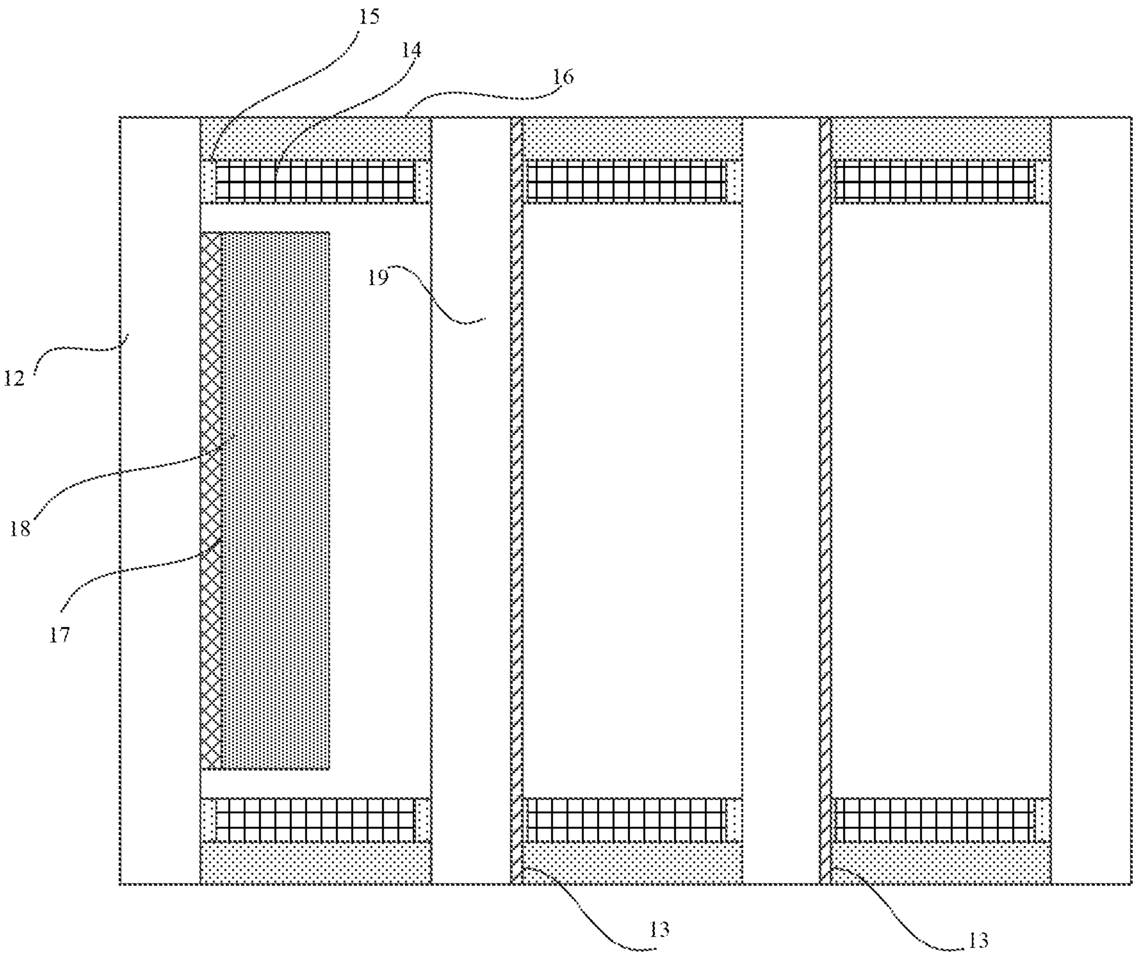

As shown in FIG. 7, in another embodiment, the dimming window includes three chambers, and the first reflective film 13 may be provided in both chambers, so that the heat transfer coefficient of the dimming window can be further reduced and the shading coefficient of the dimming window can be increased.

The first reflective film 13 may be located on different sides of the same chamber or in different chambers.

Figure 8:
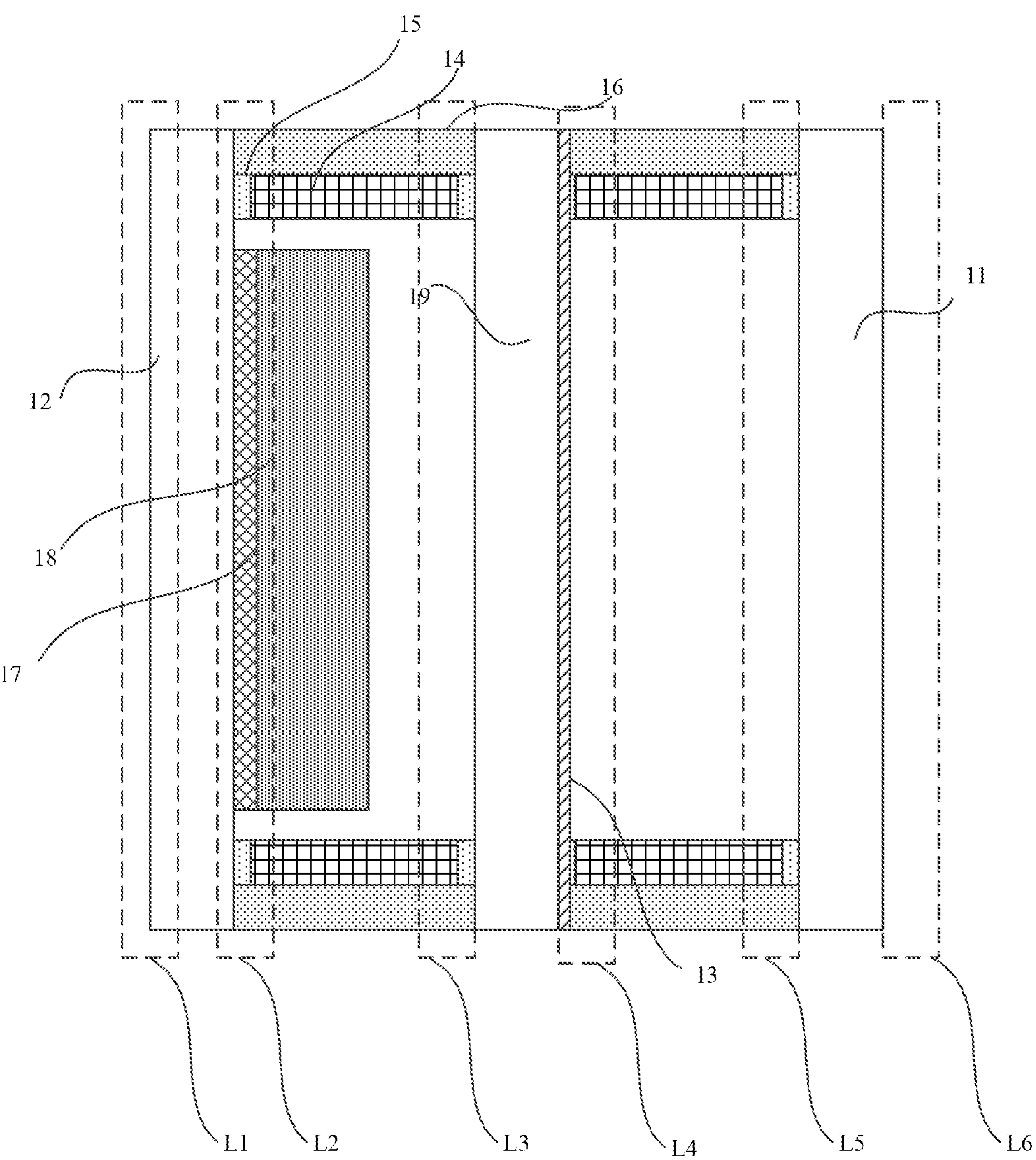

In this embodiment, as shown in FIG. 8, the dimming window includes different positions L1-L6, wherein L1 is an outer side of the first light-transmitting substrate 12, L2 is an inner side of the first light-transmitting substrate 12, L3 is a side of the second light-transmitting substrate 19 facing the first light-transmitting substrate 12, L4 is a side of the second light-transmitting substrate 19 facing the third light-transmitting substrate 11, L5 is a side of the third light-transmitting substrate 11 facing the second light-transmitting substrate 19, and L6 is a side of the third light-transmitting substrate 11 away from the second light-transmitting substrate 19. In the embodiment shown in FIG. 5, the first reflective film 13 is located at the position of L4. However, this embodiment is not limited to the position where the first reflective film 13 is located at LA, and the first reflective film 13 may be located at other positions. In the embodiment shown in FIG. 5, the dye liquid crystal dimming layer 18 is positioned at L2. However, this embodiment does not define that the dye liquid crystal dining layer 18 is located at the position of L2, and the dye liquid crystal dimming layer 18 can also be located at other positions; when the position of the dye liquid crystal dimming layer 18 is at L2, the adjustment range of the shading coefficient SC is the maximum, and as the position of the dye liquid crystal dimming layer 18 approaches to the indoor side, the adjustment range SC gradually decreases, and therefore the dye liquid crystal dimming layer 18 is optimal at the position of L2.

Figure 9:
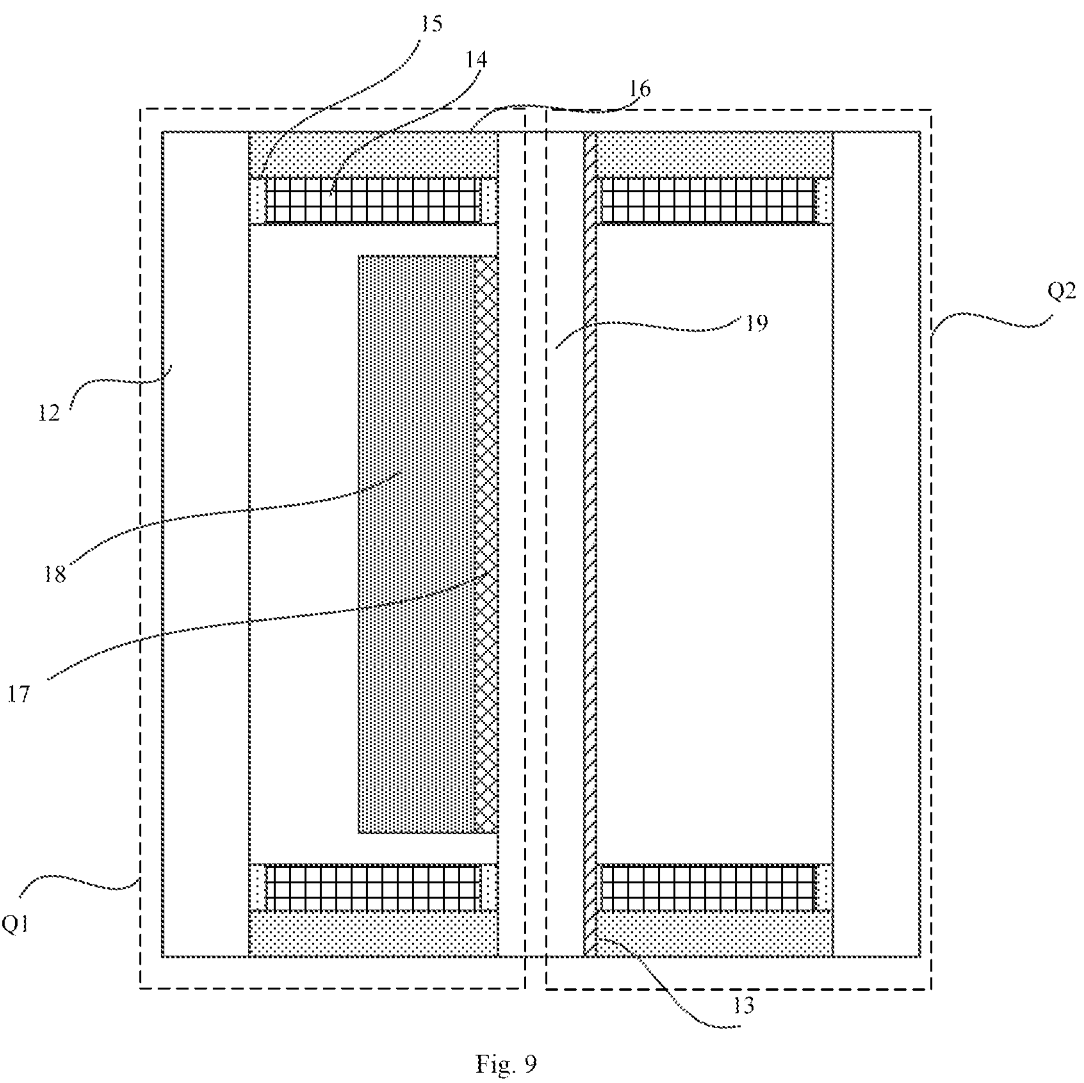

In another particular embodiment, as shown in FIG. 9, the dimming window includes two chambers; a first chamber Q1 and a second chamber Q2, wherein the first chamber Q1 includes a first light-transmitting substrate 12 and a second light-transmitting substrate 19 arranged opposite to each other; the second chamber Q2 includes a third light-transmitting substrate 11 and a second light-transmitting substrate 19 arranged opposite to each other, and the first chamber Q1 and the second chamber Q2 share the second light-transmitting substrate 19 in order to reduce the thickness of the light-transmitting window. The first light-transmitting substrate 12, the third light-transmitting substrate 11 and the second light-transmitting substrate 19 may be glass or quartz, and in particular may be tempered glass, so as to improve the structural strength of the dimming window.

In this embodiment, the first light-transmitting substrate 12 may have a sandwich glass structure, namely, a structure of tempered glass+PVB+tempered glass; since PVB has an ultraviolet blocking effect, the dye liquid crystal dimming layer 18 is relatively sensitive to the ultraviolet waveband, and the ultraviolet waveband should be blocked in order to ensure the stability of the dye liquid crystal material. In order to ensure the solar radiation stability of the dye liquid crystal dimming layer 18, the PVB in the sandwich glass structure should have a strong ultraviolet blocking ability, and it is generally required that the blocking ratio of the PVB to the light with the wavelength of less than or equal to 400 nm is greater than or equal to 99.9%. In order to improve the safety of the first light-transmitting substrate, the PVB in the sandwich glass structure can be thickened, for example, the thickness is increased from about 0.76 mm to more than 0.8 mm, for example, the thickness may be 1.52 mm, so as to improve the overall strength of the first light-transmitting substrate 12 and prevent the glass from breaking and falling after impact.

A spacer 14 is provided between the first light-transmitting substrate 12 and the second light-transmitting substrate 19 to maintain the spacing between the first light-transmitting substrate 12 and the second light-transmitting substrate 19, and the first light-transmitting substrate 12 and the second light-transmitting substrate 19 are bonded via a sealing structure to form a hollow structure with air tightness, and in order to ensure the tightness, the sealing structure includes at least two layers of sealant. As shown in FIG. 9, the sealing structure includes two layers of sealant; a first sealant 15 and a second sealant 16, wherein the first sealant 15 prevents the ingress of vapour; the second sealant 16 maintains the stability of the structure; the first sealant 15 may be a hot melt butyl adhesive, a polyisobutylene adhesive and a comfortable adhesive strip, etc.; and the second sealant 16 may be a silicone adhesive, a polyurethane adhesive and a polysulfide adhesive, etc. The chamber between the first light-transmitting substrate 12 and the second light-transmitting substrate 19 may be filled with argon gas, which has a low thermal conductivity, does not conduct heat easily, thereby better reducing the thermal conductivity of the dimming window; however, the present embodiment is not limited to filling the chamber between the first light-transmitting substrate 12 and the second light-transmitting substrate 19 with argon gas, and may also be filled with at least one of air, krypton and xenon.

The spacer 14 and the sealing structure constitute a frame sealing structure; in order to prevent the dye liquid crystal dimming layer 18 from contacting the surrounding frame sealing structure when the temperature changes, so that the dye liquid crystal dimming layer 18 is forced to break, the distance between the edge of the dye liquid crystal dimming layer 18 and the side of the frame sealing structure close to the dye liquid crystal dimming layer 18 is 0.5-5 mm. Too much distance will reduce the area of the dimming region and affect the overall aesthetics; if the distance is too small, the dye liquid crystal dimming layer 18 is easily damaged by squeezing when the temperature changes. Therefore, the distance between the edge of the dye liquid crystal dimming layer 18 and the side of the frame sealing structure close to the dye liquid crystal dimming layer 18 is designed to be 0.5-5 mm according to factors such as the manufacturing temperature of the hollow glass, the service temperature, the size of the hollow glass, the expansion/contraction performance of the material, etc.

A spacer 14 is provided between the third light-transmitting substrate 11 and the second light-transmitting substrate 19 to maintain the spacing between the third light-transmitting substrate 11 and the second light-transmitting substrate 19, and the third light-transmitting substrate 11 and the second light-transmitting substrate 19 are bonded via a sealing structure to form a hollow structure with air tightness; and in order to ensure the tightness, the sealing structure includes at least two layers of sealant. As shown in FIG. 9, the sealing structure includes two layers of sealant; a first sealant 15 and a second sealant 16, wherein the first sealant 15 prevents the ingress of vapour; the second sealant 16 maintains the stability of the structure; the first sealant 15 may be a hot melt butyl adhesive, a polyisobutylene adhesive and a comfortable adhesive strip, etc.; and the second sealant 16 may be a silicone adhesive, a polyurethane adhesive and a polysulfide adhesive, etc. The chamber between the third light-transmitting substrate 11 and the second light-transmitting substrate 19 may be filled with argon gas, which has a low thermal conductivity, does not conduct heat easily, thereby better reducing the thermal conductivity of the dimming window; however, the present embodiment is not limited to filling the chamber between the third light-transmitting substrate 11 and the second light-transmitting substrate 19 with argon gas, and may also be filled with at least one of air, krypton and xenon.

In this embodiment, in the first chamber Q1, the dye liquid crystal dimming layer 18 is bonded to the surface of the second light-transmitting substrate 19 via a bonding layer 17, which may be PVB adhesive. In the second chamber Q2, the first reflective film 13 is arranged on the surface of the second light-transmitting substrate 19, the first reflective film 13 may be a Low-e film, and the emissivity of the Low-e film is low, which helps to reduce the heat transfer coefficient of the whole dimming window. In addition, the first reflective film 13 may be formed by coating a low-emissivity coating or an adhesive film on the surface of the second light-transmitting substrate 19 to reduce the emissivity of the dimming window.

In this embodiment, the dye liquid crystal dimming layer 18 is provided only in the first chamber Q1, so that when the dimming window is applied to a building or traffic equipment, even if the dye liquid crystal dinning layer 18 absorbs part of the energy of visible light and causes the temperature thereof to increase after receiving sunlight, the dye liquid crystal dimming layer 18 can prevent the dye liquid crystal dimming layer 18 from transferring heat to the building or traffic equipment due to the blocking of the second chamber Q2, and the shading effect of the dimming window can be improved, which is more conducive to reducing the energy consumption of the building or traffic equipment.

In this embodiment, the second chamber Q2 may be designed to have a different thickness than the first chamber Q1 such that the heat transfer coefficient of the gas in the first chamber Q1 near the outer side is greater than the heat transfer coefficient of the gas in the second chamber Q2 near the inner side to facilitate the beat transfer of the radiation at the first reflective film 13 to the outer side, reducing the thermal conductivity of the entire dimming window. In this embodiment, the thickness Y of the second chamber Q2 may be designed as the thickness corresponding to the lowest heat transfer coefficient, and the thickness X of the first chamber Q1 is less than Y. The first chamber Q1 may have a thickness of 2-7 man, for example, 6 mm; the thickness of the second chamber Q2 may be 6-20 mm, for example, 9 mm. The thickness of the chamber is related to the selection of the gas layer in the chamber, and when argon is contained in the second chamber Q2, the heat transfer coefficient is the lowest when the thickness of the second chamber Q2 is about 12 mm.

In this embodiment, when the thickness of the first chamber Q1 is 6 mm and the thickness of the second chamber Q2 is 6 mm, the visible light transmittance Tv of the dimming window is 8.9%-39.4%, the shading coefficient SC is 0.3-0.34, and the heat transfer coefficient is 1.40 W/($m^2$·K); when the thickness of the first chamber Q1 is 6 mm and the thickness of the second chamber Q2 is 9 mm, the visible light transmittance Tv of the dimming window is 8.9%-39.4%, the shading coefficient SC is 0.26-0.36, and the heat transfer coefficient is 1.15 W/($m^2$·K); when the thickness of the first chamber Q1 is 6 mm and the thickness of the second chamber Q2 is 12 mm, the visible light transmittance Tv of the dimming window is 8.9%-39.4%, the shading coefficient SC is 0.24-0.34, and the heat transfer coefficient is 1.04 W/($m^2$·K); when the thickness of the first chamber Q1 is 6 mm and the thickness of the second chamber Q2 is 15 mm, the visible light transmittance Tv of the dimming window is 8.9%-39.4%, the shading coefficient SC is 0.23-0.34, and the heat transfer coefficient is 1.05 W/($m^2$·K); when the thickness of the first chamber Q1 is 6 mm and the thickness of the second chamber Q2 is 18 mm, the visible light transmittance Tv of the dimming window is 8.9%-39.4%, the shading coefficient SC is 0.24-0.34, and the heat transfer coefficient is 1.07 W/($m^2$·K); when the thickness of the first chamber Q1 is 6 mm and the thickness of the second chamber Q2 is 20 mm, the visible light transmittance Tv of the dimming window is 8.9%-39.4%, the shading coefficient SC is 0.24-0.34, and the heat transfer coefficient is 1.08 W/($m^2$·K).

When the thickness of the first chamber Q1 is 4 mum and the thickness of the second chamber Q2 is 6 mm, the visible light transmittance Tv of the dimming window is 8.9%-39.4%, the shading coefficient SC is 0.28-0.38, and the heat transfer coefficient is 1.47 W/($m^2$·K); when the thickness of the first chamber Q1 is 4 mm and the thickness of the second chamber Q2 is 9 mm, the visible light transmittance Tv of the dimming window is 8.9%-39.4%, the shading coefficient SC is 0.24-0.35, and the heat transfer coefficient is 1.20 W/($m^2$·K); when the thickness of the first chamber Q1 is 4 mm and the thickness of the second chamber Q2 is 12 mm, the visible light transmittance Tv of the dimming window is 8.9%-39.4%, the shading coefficient SC is 0.22-0.33, and the heat transfer coefficient is 1.08 W/($m^2$·K); when the thickness of the first chamber Q1 is 4 mm and the thickness of the second chamber Q2 is 15 mm, the visible light transmittance Tv of the dimming window is 8.9%-39.4%, the shading coefficient SC is 0.22-0.32, and the heat transfer coefficient is 1.10 W/($m^2$·K); when the thickness of the first chamber Q1 is 4 mm and the thickness of the second chamber Q2 is 18 mm, the visible light transmittance Tv of the dimming window is 8.9%-39.4%, the shading coefficient SC is 0.22-0.33, and the heat transfer coefficient is 1.12 W/($m^2$·K); when the thickness of the first chamber Q1 is 4 mm and the thickness of the second chamber Q2 is 20 mm, the visible light transmittance Tv of the dimming window is 8.9%-39.4%, the shading coefficient SC is 0.22-0.33, and the heat transfer coefficient is 1.13 W/($m^2$·K); The difference between the shading coefficient in the transparent state and the shading coefficient in the shading state (namely, the shading coefficient when the dye liquid crystal dimming layer 18 is in the shading state) of the dimming window in the present embodiment can reach 0.11, and the shading coefficient can be adjusted between the shading state and the transparent state.

In another embodiment, the dye liquid crystal dimming layer 18 may also be arranged at the position of L4, and the dimming window has a better shading effect; in addition, the difference between the shading coefficient in a transparent state and the shading coefficient in a shading state (namely, the shading coefficient when the dye liquid crystal dimming layer 18 is in the shading state) can reach 0.1, and the shading coefficient can be adjusted between the shading state and the transparent state.

Figure 10:
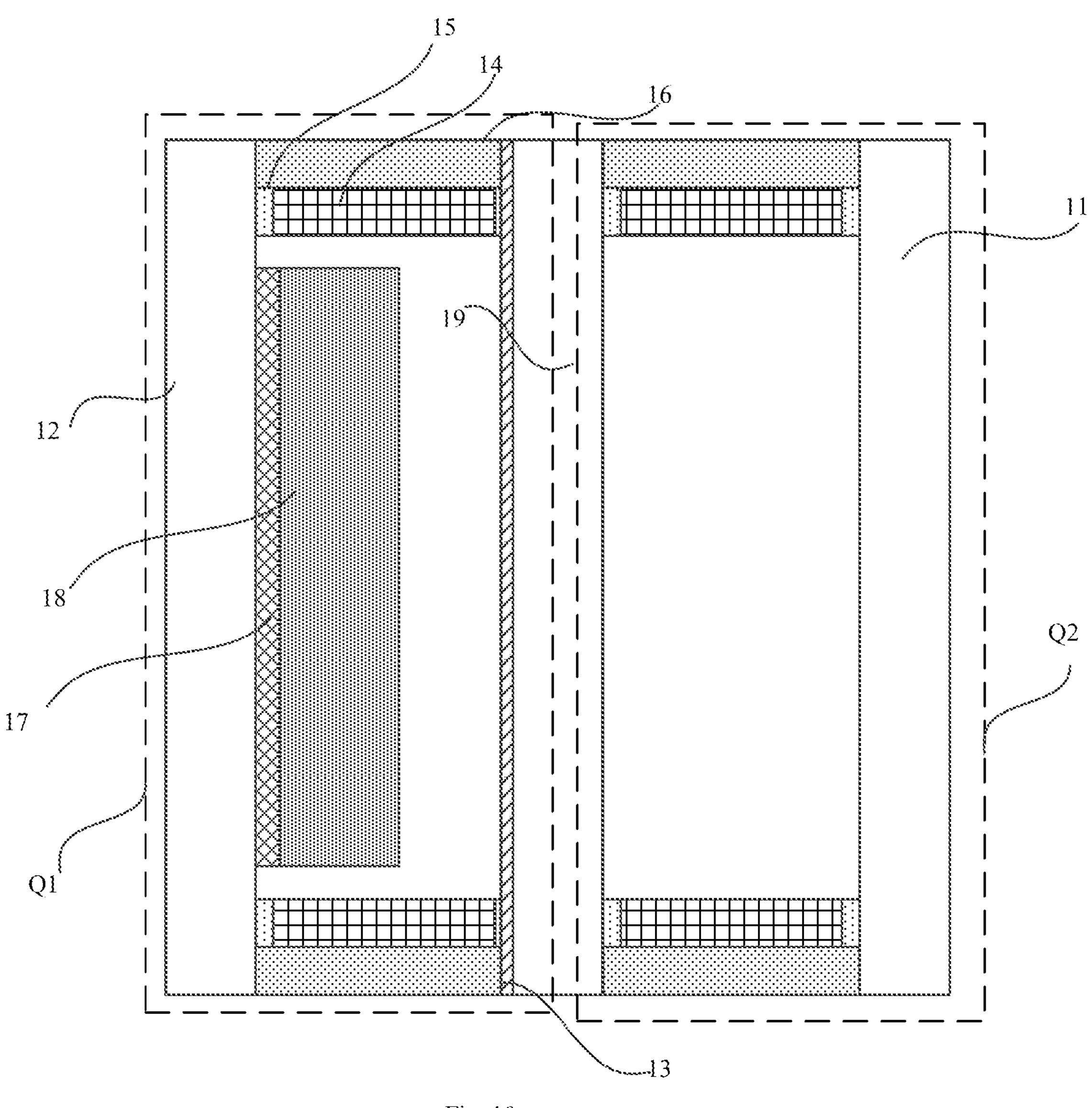

In yet another particular embodiment, as shown in FIG. 10, the dimming window includes two chambers: a first chamber Q1 and a second chamber Q2, wherein the first chamber Q1 includes a first light-transmitting substrate 12 and a second light-transmitting substrate 19 arranged opposite to each other; the second chamber Q2 includes a third light-transmitting substrate 11 and a second light-transmitting substrate 19 arranged opposite to each other, and the first chamber Q1 and the second chamber Q2 share the second light-transmitting substrate 19 in order to reduce the thickness of the light-transmitting window.

In this embodiment, in the first chamber Q1, the dye liquid crystal dimming layer 18 is bonded to the surface of the first light-transmitting substrate 12 via a bonding layer 17, which may be PVB adhesive. In the first chamber Q1, the first reflective film 13 is arranged on the surface of the second light-transmitting substrate 19, the first reflective film 13 may be a Low-e film, and the emissivity of the Low-e film is low, which helps to reduce the heat transfer coefficient of the whole dimming window. In addition, the first reflective film 13 may be formed by coating a low-emissivity coating or an adhesive film on the surface of the second light-transmitting substrate 19 to reduce the emissivity of the dimming window.

In this embodiment, the dye liquid crystal dimming layer 18 is provided only in the first chamber Q1, so that when the dimming window is applied to a building or traffic equipment, even if the dye liquid crystal dimming layer 18 absorbs part of the energy of visible light and causes the temperature thereof to increase after receiving sunlight, the dye liquid crystal dimming layer 18 can prevent the dye liquid crystal dimming layer 18 from transferring heat to the building or traffic equipment due to the blocking of the second chamber Q2, and the shading effect of the dimming window can be improved, which is more conducive to reducing the energy consumption of the building or traffic equipment.

Figure 11:
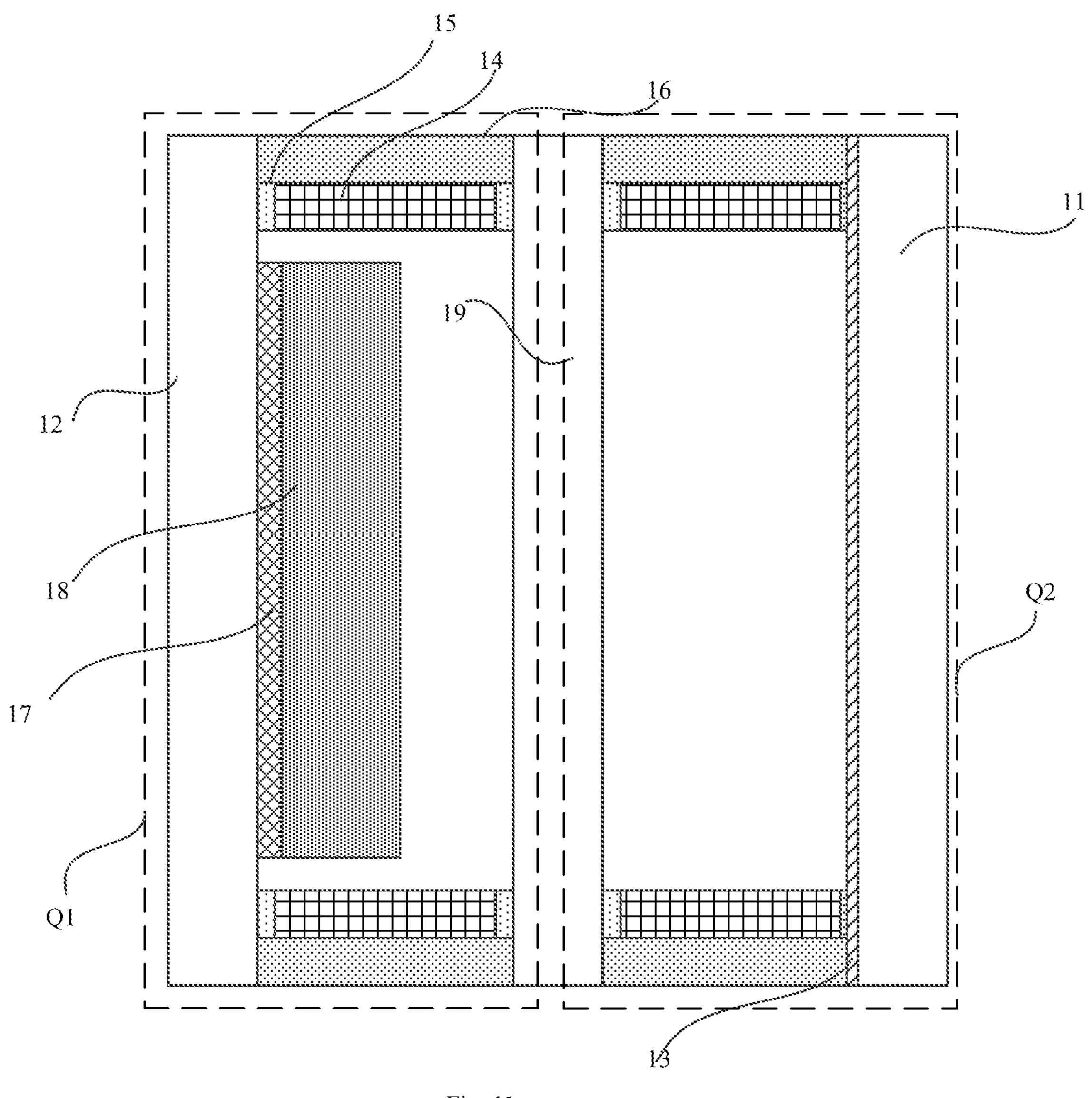

In yet another particular embodiment, as shown in FIG. 11, the dimming window includes two chambers: a first chamber Q1 and a second chamber Q2, wherein the first chamber Q1 includes a first light-transmitting substrate 12 and a second light-transmitting substrate 19 arranged opposite to each other; the second chamber Q2 includes a third light-transmitting substrate 11 and a second light-transmitting substrate 19 arranged opposite to each other, and the first chamber Q1 and the second chamber Q2 share the second light-transmitting substrate 19 in order to reduce the thickness of the light-transmitting window.

In this embodiment, in the first chamber Q1, the dye liquid crystal dimming layer 18 is bonded to the surface of the first light-transmitting substrate 12 via a bonding layer 17, which may be PVB adhesive. In the second chamber Q2, the first reflective film 13 is arranged on the surface of the third light-transmitting substrate 11, the first reflective film 13 may be a Low-e film, and the emissivity of the Low-e film is low, which helps to reduce the heat transfer coefficient of the whole dimming window. In addition, the first reflective film 13 may be formed by coating a low-emissivity coating or an adhesive film on the surface of the third light-transmitting substrate 11 to reduce the emissivity of the dimming window.

In this embodiment, the dye liquid crystal dimming layer 18 is provided only in the first chamber Q1, so that when the dimming window is applied to a building or traffic equipment, even if the dye liquid crystal dimming layer 18 absorbs part of the energy of visible light and causes the temperature thereof to increase after receiving sunlight, the dye liquid crystal dimming layer 18 can prevent the dye liquid crystal dimming layer 18 from transferring heat to the building or traffic equipment due to the blocking of the second chamber Q2, and the shading effect of the dimming window can be improved, which is more conducive to reducing the energy consumption of the building or traffic equipment.

Figure 12:
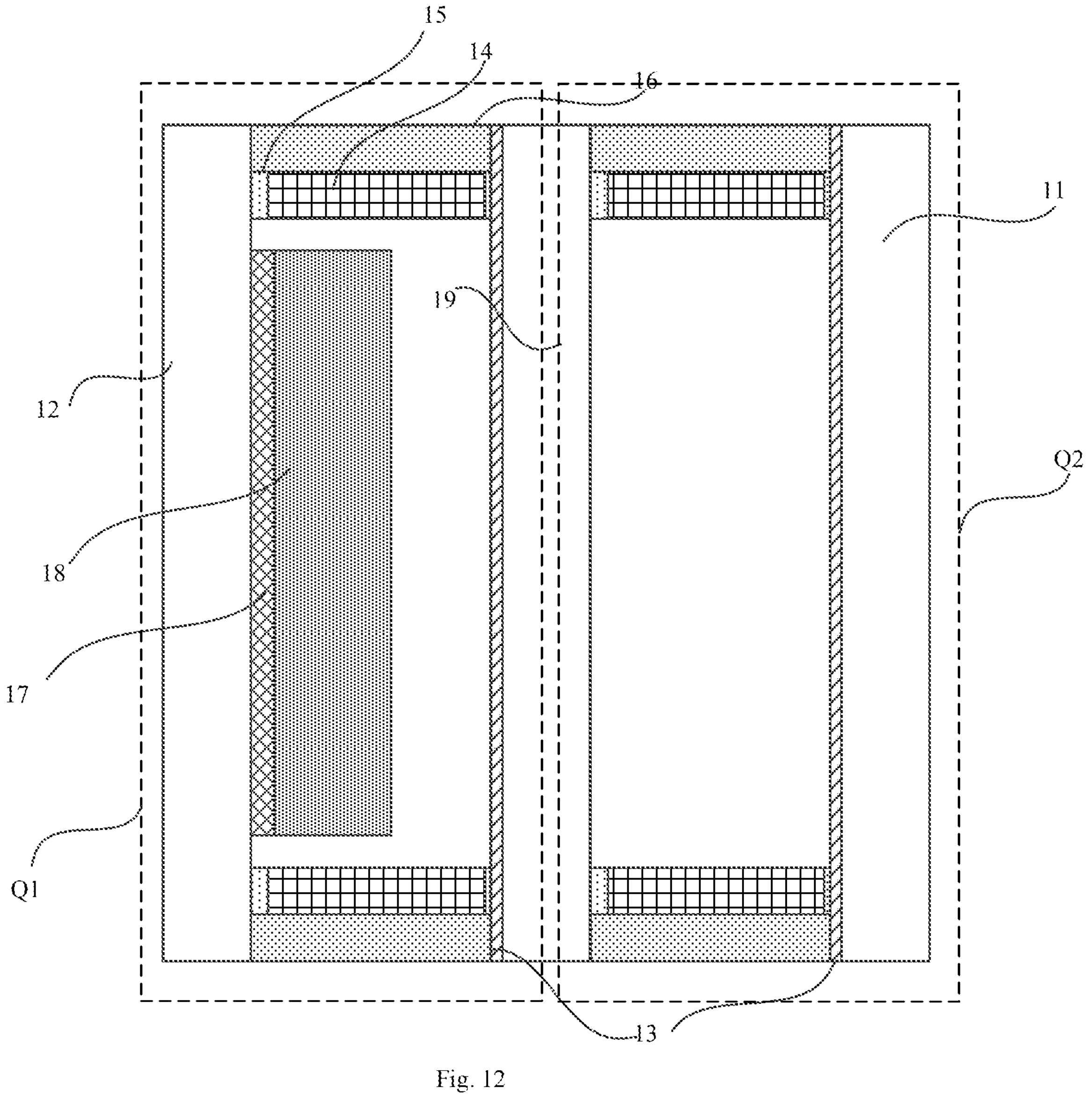

In yet another particular embodiment, as shown in FIG. 12, the dimming window includes two chambers; a first chamber Q1 and a second chamber Q2, wherein the first chamber Q1 includes a first light-transmitting substrate 12 and a second light-transmitting substrate 19 arranged opposite to each other; the second chamber Q2 includes a third light-transmitting substrate 11 and a second light-transmitting substrate 19 arranged opposite to each other, and the first chamber Q1 and the second chamber Q2 share the second light-transmitting substrate 19 in order to reduce the thickness of the light-transmitting window.

In this embodiment, in the first chamber Q1, the dye liquid crystal dimming layer 18 is bonded to the surface of the first light-transmitting substrate 12 via a bonding layer 17, which may be PVB adhesive. In the second chamber Q2, the first reflective film 13 is arranged on the surface of the third light-transmitting substrate 11; in the first chamber Q1, the first reflective film 13 is arranged on the surface of the second light-transmitting substrate 19; the first reflective film 13 may be a Low-e film, and the emissivity of the Low-e film is low, which helps to reduce the heat transfer coefficient of the whole dimming window. In addition, the first reflective film 13 may be formed by coating a low-emissivity coating or an adhesive film on the surface of the second light-transmitting substrate 19 to reduce the emissivity of the dimming window.

In this embodiment, the dye liquid crystal dimming layer 18 is provided only in the first chamber Q1, so that when the dimming window is applied to a building or traffic equipment, even if the dye liquid crystal dimming layer 18 absorbs part of the energy of visible light and causes the temperature thereof to increase after receiving sunlight, the dye liquid crystal dimming layer 18 can prevent the dye liquid crystal dimming layer 18 from transferring heat to the building or traffic equipment due to the blocking of the second chamber Q2, and the shading effect of the dimming window can be improved, which is more conducive to reducing the energy consumption of the building or traffic equipment. Further, in this embodiment, by providing the double-layered first reflective film 13, the sun-shading effect of the dimming window can be further improved.

Figure 13:
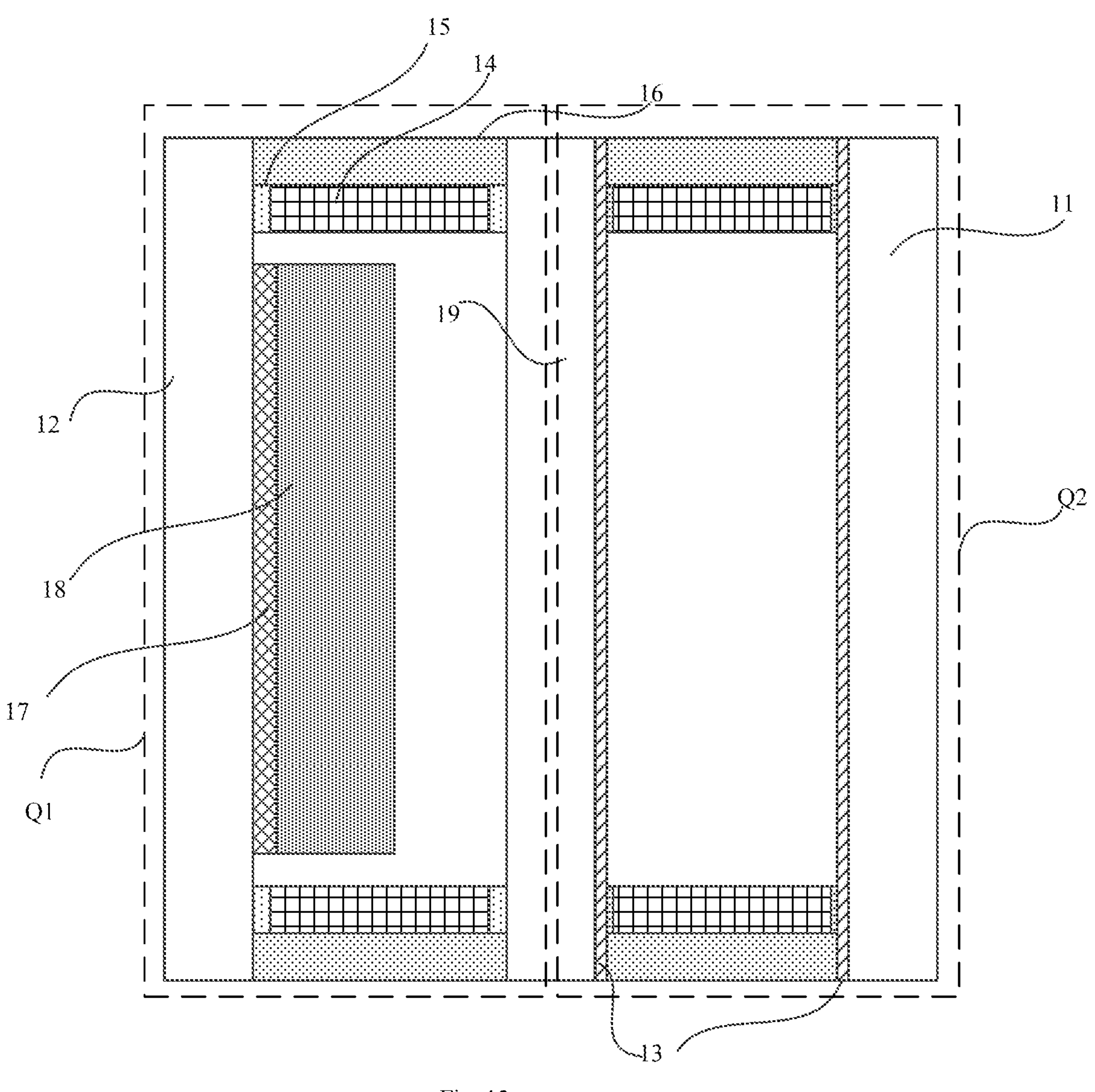

In yet another particular embodiment, as shown in FIG. 13, the dimming window includes two chambers: a first chamber Q1 and a second chamber Q2, wherein the first chamber Q1 includes a first light-transmitting substrate 12 and a second light-transmitting substrate 19 arranged opposite to each other; the second chamber Q2 includes a third light-transmitting substrate 11 and a second light-transmitting substrate 19 arranged opposite to each other, and the first chamber Q1 and the second chamber Q2 share the second light-transmitting substrate 19 in order to reduce the thickness of the light-transmitting window.

In this embodiment, in the first chamber Q1, the dye liquid crystal dimming layer 18 is bonded to the surface of the first light-transmitting substrate 12 via a bonding layer 17, which may be PVB adhesive. In the second chamber Q2, the first reflective film 13 is arranged on the surface of the third light-transmitting substrate 11 and the second light-transmitting substrate 19, the first reflective film 13 may be a Low-e film, and the emissivity of the Low-e film is low, which helps to reduce the heat transfer coefficient of the whole dimming window. In addition, the first reflective film 13 may be formed by coating a low-emissivity coating or an adhesive film on the surface of the second light-transmitting substrate 19 to reduce the emissivity of the dimming window.

In this embodiment, the dye liquid crystal dimming layer 18 is provided only in the first chamber Q1, so that when the dimming window is applied to a building or traffic equipment, even if the dye liquid crystal dimming layer 18 absorbs part of the energy of visible light and causes the temperature thereof to increase after receiving sunlight, the dye liquid crystal dimming layer 18 can prevent the dye liquid crystal dimming layer 18 from transferring heat to the building or traffic equipment due to the blocking of the second chamber Q2, and the shading effect of the dimming window can be improved, which is more conducive to reducing the energy consumption of the building or traffic equipment. Further, in this embodiment, by providing the double-layered first reflective film 13, the sun-shading effect of the dimming window can be further improved.

The dimming window of the present embodiment can be applied inside a building as a curtain wall, a lighting roof, etc. of the building, can reduce the energy consumption of cooling in summer and heating in winter of the building, and has a good shading effect; and the application of the dimming window can eliminate the need for adding an additional shading device outside the building, and can improve the overall aesthetic appearance of the building. The difference between the shading coefficient in the transparent state and the shading coefficient in the shading state of the dimming window in the present embodiment can reach 0.14, so that the shading coefficient can be adjusted between the shading state and the transparent state, and the indoor heat can be adjusted according to the modes of cooling in summer and heating in winter of the building, thereby significantly reducing the energy consumption of air conditioning of the building; The heat transfer coefficient of the dimming window in this embodiment can be reduced to 1.04 $W/(m^2 \cdot K)$, which can improve the thermal insulation effect of the building maintenance structure and reduce the heat transfer due to the temperature difference between indoor and outdoor, so as to help maintain the stability of indoor thermal environment.

The dimming window according to the present embodiment can also be applied to vehicles such as automobiles, trains, airplanes, etc., for example, as a vehicle window, which can reduce the energy consumption for cooling in summer and heating in winter of the vehicle and has a good shading effect, and the application of the dimming window can make it unnecessary to add an additional shading device on the outside of the vehicle and improve the overall aesthetic appearance of the vehicle. The difference between the shading coefficient in the transparent state and the shading coefficient in the shading state of the dimming window in the present embodiment can reach 0.14, so that the shading coefficient can be adjusted between the shading state and the transparent state, and the heat in the vehicle can be adjusted according to the modes of cooling in summer and heating in winter of the vehicle, thereby significantly reducing the energy consumption of air conditioning of the vehicle; The heat transfer coefficient of the dimming window in this embodiment can be reduced to 1.04 W/($m^2$·K), which can improve the heat preservation effect of the vehicle and reduce the heat transfer due to the temperature difference between the inside and outside of the vehicle, so as to help maintain the stability of the thermal environment inside the vehicle.

An embodiment of the present disclosure further provides a method for manufacturing the dimming window, including:

forming at least two chambers arranged in a stack, each of the chambers comprising two light-transmitting substrates arranged opposite to each other;

the at least two chambers including a first chamber and a second chamber, forming a dimming structure in the first chamber, and forming a first reflective film in the first chamber and/or the second chamber;

wherein the thickness of the second chamber is greater than or equal to the thickness of the first chamber, and the thickness of the chamber is a distance between two opposite surfaces of the two light-transmitting substrates of the chamber.

In the present embodiment, the dimming window includes a plurality of chambers, and the dinning structure is provided only in the first chamber, so that when the dimming window is applied to a building or traffic equipment, after receiving sunlight, even if the dimming structure absorbs part of the energy of visible light and the temperature thereof is increased, due to the blocking of other chambers, the dimming structure also avoids transferring heat into the building or traffic equipment, and the shading effect of the dimming window can be improved, thereby the energy consumption of the building or traffic equipment is reduced. In addition, the thickness of the second chamber is greater than or equal to the thickness of the first chamber, thereby the heat transfer coefficient of the dining window is further reduced.

The dimming window may include two chambers, three chambers or more chambers, and the more chambers are included, the better the shading effect of the dimming window is, and the lower the heat transfer coefficient is, but at the same time, an increase in cost and a decrease in transmittance of the dimming window are brought, and therefore, the dimming window preferably includes two or three chambers. When the dimming window includes two or three chambers, on the one hand, the cost of the dimming window can be controlled to ensure the transmittance of the dimming window, and on the other hand, the shading effect of the dimming window can be better and the heat transfer coefficient can be lower.

In some embodiments, the dimming structure includes a dye liquid crystal dimming layer, the dye liquid crystal dimming layer includes a first substrate, a second substrate arranged opposite to each other and a dye liquid crystal layer provided between the first substrate and the second substrate, the dye liquid crystal layer includes liquid crystal molecules and dye molecules, and the liquid crystal molecules are used for driving rotation of the dye molecules under action of an electric field generated between the first substrate and the second substrate so as to control the transmittance of light.

In some embodiments, the dye liquid crystal layer may include a first dye liquid crystal layer and a second dye liquid crystal layer, the first dye liquid crystal layer and the second dye liquid crystal layer being bonded together by a bonding layer.

In this embodiment, as shown in FIGS. 2 and 3, the dye liquid crystal dimming layer includes a first base 081 and a second base 085 arranged opposite to each other, a first electrode layer 082 arranged on the first base 081, a second electrode layer 084 arranged on the second base 085, and a dye liquid crystal layer 083 located between the first electrode layer 082 and the second electrode layer 084, wherein the dye liquid crystal layer 083 is formed by mixing a negative liquid crystal and a dichroic dye, and the dichroic dye can rotate with the liquid crystal, and the absorption amount thereof gradually increases with the rotation angle. As shown in FIG. 2, when the driving voltage is 0 V, the liquid crystal and the dye molecules do not rotate, and the light absorption is the least, showing a shading state; as shown in FIG. 3, when the driving voltage is 10 V, the rotation angle of the liquid crystal and the dye molecules reaches a maximum of 90 degrees, and the absorption amount also reaches a maximum, exhibiting a transparent state. By controlling the voltages applied to the first electrode layer 082 and the second electrode layer 084, the liquid crystal rotation of the dye liquid crystal layer 083 is controlled, and thus the light transmitted through the dye liquid crystal dimming layer is controlled, so as to achieve the shading effect of the dimming window.

The transmission spectrum of the dye liquid crystal dimming layer is as shown in FIG. 3, and it can be seen that the dye liquid crystal dimming layer only adjusts for the visible light region, and light in the near-infrared waveband can still transmit through the dye liquid crystal dimming layer; therefore, in this embodiment, a first reflective film is provided in at least one of the at least two chambers, and the first reflective film can reflect near-infrared light, and, in cooperation with the dye liquid crystal dimming layer, can adjust and control light in the whole waveband. In this embodiment, the first reflective film may be provided in all of the at least two chambers, or may be provided in some of the at least two chambers. Although the first reflective film can reflect near-infrared light to improve the shading effect of the dimming window, the first reflective film also affects the transmittance of the dimming window at the same time, and therefore the dimming window may include one or two first reflective films, so that the shading effect and the transmittance of the dimming window can be taken into consideration, wherein the first reflective film may be located in the same chamber as the dye liquid crystal dimming layer, or may be located in different chambers.

In some embodiments, the first chamber includes a first light-transmitting substrate and a second light-transmitting substrate arranged opposite to each other; the second chamber includes a third light-transmitting substrate and the second light-transmitting substrate arranged opposite to each other; the dye liquid crystal dimming layer is located on a side of the first light-transmitting substrate close to the second light-transmitting substrate.

In some embodiments, forming a first reflective film specifically includes:

forming the first reflective film on a side of the second light-transmitting substrate close to the third light-transmitting substrate; and/or forming the first reflective film on a side of the second light-transmitting substrate close to the first light-transmitting substrate.

In some embodiments, forming a first reflective film specifically includes:

forming the first reflective film on a side of the second light-transmitting substrate close to the third light-transmitting substrate; and/or forming the first reflective film on a side of the third light-transmitting substrate close to the second light-transmitting substrate.

In some embodiments, the manufacturing method further includes:

as shown in FIGS. 5-13, forming a spacer 14 between the first light-transmitting substrate 12 and the second light-transmitting substrate 19 to maintain the spacing between the first light-transmitting substrate 12 and the second light-transmitting substrate 19;

forming a sealing structure between the first light-transmitting substrate 12 and the second light-transmitting substrate 19 to bond the first light-transmitting substrate 12 and the second light-transmitting substrate 19, so as to form a hollow structure with air tightness, wherein in order to ensure the tightness, the sealing structure includes at least two layers of sealant. The sealing structure may include two layers of sealant; a first sealant 15 and a second sealant 16, wherein the first sealant 15 prevents the ingress of vapour; the second sealant 16 maintains the stability of the structure; the first sealant 15 may be a hot melt butyl adhesive, a polyisobutylene adhesive and a comfortable adhesive strip, etc.; and the second sealant 16 may be a silicone adhesive, a polyurethane adhesive and a polysulfide adhesive, etc.

In addition, the chamber between the first light-transmitting substrate 12 and the second light-transmitting substrate 19 may be filled with argon gas, which has a low thermal conductivity, does not conduct heat easily, thereby better reducing the thermal conductivity of the dimming window; however, the present embodiment is not limited to filling the chamber between the first light-transmitting substrate 12 and the second light-transmitting substrate 19 with argon gas, and may also be filled with at least one of air, krypton and xenon.

In some embodiments, the manufacturing method further includes:

as shown in FIGS. 5-13, forming a spacer 14 between the third light-transmitting substrate 11 and the second light-transmitting substrate 19 to maintain the spacing between the third light-transmitting substrate 11 and the second light-transmitting substrate 19;

forming a sealing structure between the third light-transmitting substrate 11 and the second light-transmitting substrate 19 to bond the third light-transmitting substrate 11 and the second light-transmitting substrate 19, so as to form a hollow structure with air tightness, wherein in order to ensure the tightness, the sealing structure includes at least two layers of sealant. As shown in FIG. 9, the sealing structure includes two layers of sealant: a first sealant 15 and a second sealant 16, wherein the first sealant 15 prevents the ingress of vapour; the second sealant 16 maintains the stability of the structure; the first sealant 15 may be a hot melt butyl adhesive, a polyisobutylene adhesive and a comfortable adhesive strip, etc.; and the second sealant 16 may be a silicone adhesive, a polyurethane adhesive and a polysulfide adhesive, etc.

In addition, the chamber between the third light-transmitting substrate 11 and the second light-transmitting substrate 19 may be filled with argon gas, which has a low thermal conductivity, does not conduct heat easily, thereby better reducing the thermal conductivity of the dimming window; however, the present embodiment is not limited to filling the chamber between the third light-transmitting substrate 11 and the second light-transmitting substrate 19 with argon gas, and may also be filled with at least one of air, krypton and xenon.

It should be noted that the various embodiments described herein are described in a progressive manner with reference to the same or similar parts throughout the various embodiments, with each embodiment focusing on differences from the other embodiments. In particular, the embodiments are described more simply because they are substantially similar to the product embodiments, with reference to the partial description of the product embodiments.

Unless defined otherwise, technical or scientific terms used in this disclosure shall have the ordinary meaning as understood by one of ordinary skill in the art to which this disclosure belongs. The terms “first”, “second”, and the like as use herein do not denote any order, quantity, or importance, but rather are used to distinguish one element from another. The terms “comprising” or “comprises”, and the like, means that the presence of an element or item preceding the word covers the presence of the element or item listed after the word and equivalents thereof, but does not exclude other elements or items. The terms “connecting” or “connected” and the like are not limited to physical or mechanical connections, but may include electrical connections, whether direct or indirect. The terms “upper”, “lower”, “left”, “right” and the like are used only to indicate relative positional relationships that may change accordingly when the absolute position of the object being described changes.

It will be understood that when an element such as a layer, film, region or substrate is referred to as being “on” or “under” another element, it can be “directly on” or “directly under” the other element or intervening elements may be present.

In the description of the embodiments above, particular features, structures, materials, or characteristics may be combined in any suitable manner in any one or more embodiments or examples.

While the prevent disclosure has been described with reference to specific embodiments thereof, it will be understood by those skilled is the art that various changes may be made and equivalents may be substituted for elements thereof without departing from the scope of the disclosure. Accordingly, the protection sought herein in as set forth in the claims below.

What is claimed is:

1. A dimming window, comprising:

at least two chambers arranged in a stack, each of the chambers comprising two light-transmitting substrates arranged opposite to each other;

the at least two chambers comprise a first chamber and a second chamber, a dimming structure is provided in the first chamber, and a first reflective film is provided in the first chamber and/or the second chamber;

wherein the thickness of the second chamber is greater than the thickness of the first chamber, the thickness of the chamber is a distance between two opposite surfaces of the two light-transmitting substrates of the chamber;

wherein the thickness of the second chamber is 6-20 mm;

wherein a frame sealing structure is provided between two oppositely arranged light-transmitting substrates within each of the chambers, the frame sealing structure comprises a sealing structure and a spacer, and a hollow structure having an air tightness is formed by bonding the sealing structure, the sealing structure comprising at least two layers of sealant;

wherein within the first chamber, a distance between an edge of the dimming structure and a side of the frame sealing structure close to the dimming structure is 0.5-5 mm.

2. The dimming window according to claim 1, wherein the dimming structure comprises a dye liquid crystal dimming layer, the dye liquid crystal dimming layer comprises a first substrate, a second substrate arranged opposite to each other and a dye liquid crystal layer provided between the first substrate and the second substrate, the dye liquid crystal layer comprises liquid crystal molecules and dye molecules, and the liquid crystal molecules are used for driving rotation of the dye molecules under action of an electric field generated between the first substrate and the second substrate to control the transmittance of light.

3. The dimming window according to claim 2, wherein the dye liquid crystal layer comprises a first dye liquid crystal layer and a second dye liquid crystal layer, the first dye liquid crystal layer and the second dye liquid crystal layer being bonded together by a bonding layer.

4. The dimming window according to claim 1, wherein the first chamber comprises a first light-transmitting substrate and a second light-transmitting substrate arranged opposite to each other;

the second chamber comprises a third light-transmitting substrate and the second light-transmitting substrate arranged opposite to each other;

the dimming structure is located on a side of the first light-transmitting substrate, the side of the first light-transmitting substrate is close to the second light-transmitting substrate.

5. The dimming window according to claim 4, wherein the first reflective film is located on a side of the second light-transmitting substrate, the side of the second light-transmitting substrate is close to the third light-transmitting substrate; and/or the first reflective film is located on a side of the second light-transmitting substrate close to the first light-transmitting substrate.

6. The dimming window according to claim 4, wherein the first reflective film is located on a side of the second light-transmitting substrate close to the third light-transmitting substrate; and/or the first reflective film is located on a side of the third light-transmitting substrate close to the second light-transmitting substrate.

7. The dimming window according to claim 4, wherein the thickness of the first chamber is a distance in a first direction between a surface of the first light-transmitting substrate close to the second light-transmitting substrate and a surface of the second light-transmitting substrate close to the first light-transmitting substrate;

the thickness of the second chamber is a distance in the first direction between a surface of the third light-transmitting substrate close to the second light-transmitting substrate and a surface of the second light-transmitting substrate close to the third light-transmitting substrate;

the first direction is a direction perpendicular to a surface of the first light-transmitting substrate.

8. The dimming window according to claim 1, wherein the chambers are filled with argon.

9. The dimming window according to claim 1, wherein the sealing structure comprises two layers of sealant, wherein the sealant at the side away from the dimming structure is a silicone adhesive, a polyurethane adhesive or a polysulfide adhesive;

the sealant at the side close to the dimming structure is a hot-melt butyl adhesive or a polyisobutylene adhesive.

10. The dimming window according to claim 1, wherein the dimming structure is bonded to a surface of the light-transmitting substrate of the first chamber through a bonding layer.

11. The dimming window according to claim 4, wherein the first light-transmitting substrate has a sandwich structure of tempered glass, a PVB layer and tempered glass, a blocking ratio of the PVB layer to light with a wavelength of less than or equal to 400 nm is greater than or equal to 99.9%; and/or the thickness of the PVB layer is not less than 0.8 mm.

12. A method for manufacturing a dimming window, comprising:

forming at least two chambers arranged in a stack, each of the chambers comprising two light-transmitting substrates arranged opposite to each other, the at least two chambers comprising a first chamber and a second chamber;

forming a dimming structure in the first chamber, and forming a first reflective film in the first chamber and/or the second chamber;

wherein the thickness of the second chamber is greater than the thickness of the first chamber, and the thickness of the chamber is a distance between two opposite surfaces of the two light-transmitting substrates of the chamber;

wherein the thickness of the second chamber is 6-20 mm;

wherein a frame sealing structure is provided between two oppositely arranged light-transmitting substrates within each of the chambers, the frame sealing structure comprises a sealing structure and a spacer, and a hollow structure having an air tightness is formed by bonding the sealing structure, the sealing structure comprising at least two layers of sealant;

wherein within the first chamber, a distance between an edge of the dimming structure and a side of the frame sealing structure close to the dimming structure is 0.5-5 mm.

13. The dimming window according to claim 1, wherein the sealing structure comprises at least a first sealant and a second sealant, the first sealant is located between the spacer and a light-transmitting substrate, and the second sealant is located on a side of the spacer away from the dimming structure.

14. The dimming window according to claim 4, wherein a spacer is provided between the first light-transmitting substrate and the second light-transmitting substrate to maintain the spacing between the first light-transmitting substrate and the second light-transmitting substrate.

15. The dimming window according to claim 4, wherein a spacer is disposed between the third light-transmitting substrate and the second light-transmitting substrate to maintain the spacing between the third light-transmitting substrate and the second light-transmitting substrate.

* * * * *